(12) United States Patent
Lim et al.

(10) Patent No.: US 12,199,314 B2
(45) Date of Patent: Jan. 14, 2025

(54) ELECTRODE ASSEMBLY AND SECONDARY BATTERY COMPRISING THE SAME

(71) Applicant: LG CHEM, LTD., Seoul (KR)

(72) Inventors: Hae Jin Lim, Daejeon (KR); Min Kim, Daejeon (KR); Sang Uck Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 993 days.

(21) Appl. No.: 17/261,417

(22) PCT Filed: Jul. 19, 2019

(86) PCT No.: PCT/KR2019/008948
§ 371 (c)(1),
(2) Date: Jan. 19, 2021

(87) PCT Pub. No.: WO2020/017923
PCT Pub. Date: Jan. 23, 2020

(65) Prior Publication Data
US 2021/0265708 A1 Aug. 26, 2021

(30) Foreign Application Priority Data

Jul. 20, 2018 (KR) .................. 10-2018-0084529
Jun. 4, 2019 (KR) .................. 10-2019-0066144

(51) Int. Cl.
*H01M 50/538* (2021.01)
*H01M 10/04* (2006.01)
(Continued)

(52) U.S. Cl.
CPC ..... *H01M 50/538* (2021.01); *H01M 10/0431* (2013.01); *H01M 10/0525* (2013.01); *H01M 10/0587* (2013.01)

(58) Field of Classification Search
CPC .......... H01M 50/538; H01M 10/0431; H01M 10/0525; H01M 10/0587
See application file for complete search history.

(56) References Cited

U.S. PATENT DOCUMENTS

| | | | |
|---|---|---|---|
| 2002/0068217 A1 | 6/2002 | Watanabe et al. | |
| 2005/0003264 A1 | 1/2005 | Oh et al. | |

(Continued)

FOREIGN PATENT DOCUMENTS

| | | |
|---|---|---|
| CN | 1929188 A | 3/2007 |
| CN | 104769763 A | 7/2015 |

(Continued)

OTHER PUBLICATIONS

Takemura et al., "JP2000067907A English Translation", Mar. 3, 2000.*

(Continued)

*Primary Examiner* — Matthew T Martin
*Assistant Examiner* — Alexandra J Simmons
(74) *Attorney, Agent, or Firm* — Birch, Stewart, Kolasch & Birch, LLP

(57) ABSTRACT

An electrode assembly including a positive electrode sheet having a positive electrode active material portion that is an area on which a positive electrode active material is stacked on a positive electrode collector and a positive electrode non-coating portion, a positive electrode tab disposed on the positive electrode non-coating portion, a negative electrode sheet having a negative electrode active material portion that is an area on which a negative electrode active material is stacked on a negative electrode collector and a negative electrode non-coating portion; a negative electrode tab disposed on the negative electrode non-coating portion, and a separator insulating the positive electrode sheet and the negative electrode sheet from each other is provided. The (Continued)

positive electrode non-coating portion includes a first positive electrode non-coating portion and a second positive electrode non-coating portion, which are provided on two portions spaced apart from each other on the positive electrode sheet.

19 Claims, 10 Drawing Sheets

(51) Int. Cl.
*H01M 10/0525* (2010.01)
*H01M 10/0587* (2010.01)

(56) References Cited

U.S. PATENT DOCUMENTS

| | | | |
|---|---|---|---|
| 2006/0051662 A1* | 3/2006 | Kwak et al. | H01M 10/0431 429/142 |
| 2006/0147793 A1 | 7/2006 | Kim et al. | |
| 2009/0317701 A1 | 12/2009 | Cha et al. | |
| 2010/0035144 A1 | 2/2010 | Oh et al. | |
| 2010/0190056 A1 | 7/2010 | Turner et al. | |
| 2011/0117406 A1 | 5/2011 | Cho et al. | |
| 2012/0009450 A1 | 1/2012 | Chun | |
| 2012/0177963 A1 | 7/2012 | Lee et al. | |
| 2012/0196165 A1 | 8/2012 | Kim | |
| 2012/0208055 A1 | 8/2012 | Ahn | |
| 2014/0178729 A1 | 6/2014 | Chung et al. | |
| 2015/0037638 A1 | 2/2015 | Kim et al. | |
| 2015/0295270 A1* | 10/2015 | Chun | H01M 50/534 429/94 |
| 2016/0260939 A1 | 9/2016 | Horikoshi | |
| 2016/0351966 A1 | 12/2016 | Batson et al. | |
| 2017/0092926 A1 | 3/2017 | Doo et al. | |
| 2018/0315980 A1 | 11/2018 | Lee et al. | |
| 2019/0348719 A1 | 11/2019 | Batson et al. | |
| 2020/0168852 A1 | 5/2020 | Oh et al. | |

FOREIGN PATENT DOCUMENTS

| | | | |
|---|---|---|---|
| EP | 3 236 513 A1 | 10/2017 | |
| JP | 10-162861 A | 6/1998 | |
| JP | 10-261439 A | 9/1998 | |
| JP | 11-26023 A | 1/1999 | |
| JP | 2000-67907 A | 3/2000 | |
| JP | 2000067907 A * | 3/2000 | ............ Y02P 70/50 |
| JP | 2000-260417 A | 9/2000 | |
| JP | 2000-285898 A | 10/2000 | |
| JP | 3119259 B2 | 12/2000 | |
| JP | 2002-164044 A | 6/2002 | |
| JP | 2004-356085 A | 12/2004 | |
| JP | 2008-260892 A | 9/2006 | |
| JP | 2009-245839 A | 10/2009 | |
| JP | 2010-55906 A | 3/2010 | |
| JP | 2011-108614 A | 6/2011 | |
| JP | 2012-23011 A | 2/2012 | |
| JP | 2012-169247 A | 9/2012 | |
| JP | 2012-195132 A | 10/2012 | |
| JP | 2014-13647 A | 1/2014 | |
| JP | 2014-167890 A | 9/2014 | |
| JP | 2014-225326 A | 12/2014 | |
| JP | 2015-35250 A | 2/2015 | |
| JP | 2015-115293 A | 6/2015 | |
| JP | 2017-504165 A | 2/2017 | |
| JP | 2018-18646 A | 2/2018 | |
| KR | 10-2004-0058921 A | 7/2004 | |
| KR | 10-2005-0123366 A | 12/2005 | |
| KR | 10-2008-0047165 A | 5/2008 | |
| KR | 10-1002487 B1 | 12/2010 | |
| KR | 10-2012-0088210 A | 8/2012 | |
| KR | 10-2014-0059737 A | 5/2014 | |
| KR | 10-2015-0089448 A | 8/2015 | |
| KR | 10-2015-0117135 A | 10/2015 | |
| KR | 10-2016-0010080 A | 1/2016 | |
| KR | 10-2016-0010121 A | 1/2016 | |
| KR | 10-2018-0101347 A | 8/2016 | |
| KR | 10-2016-0108857 A | 9/2016 | |
| KR | 10-2017-0036466 A | 4/2017 | |
| KR | 10-2018-0007298 A | 1/2018 | |
| KR | 10-1841306 B1 | 3/2018 | |
| WO | 2014/073890 A1 | 5/2014 | |
| WO | WO2017/047353 A1 | 3/2017 | |

OTHER PUBLICATIONS

Extended European Search Report for European Application No. 19837600.6, dated Mar. 25, 2022.
International Search Report for PCT/KR2019/008948 mailed on Oct. 28, 2019.
Partial Supplementary European Search Report for European Application No. 19837600.6, dated Nov. 10, 2021.

* cited by examiner

ELECTRODE ASSEMBLY AND SECONDARY BATTERY COMPRISING THE SAME

CROSS-REFERENCE TO RELATED APPLICATION

The present application claims the benefit of the priority of Korean Patent Application Nos. 10-2018-0084529, filed on Jul. 20, 2018, and 10-2019-0066144, filed on Jun. 4, 2019, which are hereby incorporated by reference in their entirety.

TECHNICAL FIELD

The present invention relates to an electrode assembly and a secondary battery comprising the same.

BACKGROUND ART

Secondary batteries are rechargeable unlike primarily batteries, and also, the possibility of compact size and high capacity is high. Thus, recently, many studies on rechargeable batteries are being carried out. As technology development and demands for mobile devices increase, the demands for rechargeable batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, stacked type electrode assembly in which a plurality of positive and negative electrodes with a separator therebetween are sequentially stacked, and a stack/folding type electrode assembly in which stacked type unit cells are wound together with a separation film having a long length. Among them, the jelly-roll type electrode assembly is widely used because the jelly-roll type electrode assembly has an advantage is easily manufactured and has high energy density per weight.

DISCLOSURE OF THE INVENTION

Technical Problem

One aspect of the present invention is to provide an electrode assembly that is capable of reducing resistance and a secondary battery comprising the same.

Also, another aspect of the present invention is to provide an electrode assembly that is capable of minimizing a capacity loss and a secondary battery comprising the same.

Technical Solution

An electrode assembly according to a first embodiment of the present invention comprises: a positive electrode sheet comprising a positive electrode active material portion that is an area on which a positive electrode active material is stacked on a positive electrode collector and a positive electrode non-coating portion that is an area on which the positive electrode active material is not stacked; a positive electrode tab disposed on the positive electrode non-coating portion; a negative electrode sheet comprising a negative electrode active material portion that is an area on which a negative electrode active material is stacked on a negative electrode collector and a negative electrode non-coating portion that is an area on which the negative electrode active material is not stacked; a negative electrode tab disposed on the negative electrode non-coating portion; and a separator configured to insulate the positive electrode sheet and the negative electrode sheet from each other, wherein the positive electrode non-coating portion comprises a first positive electrode non-coating portion and a second positive electrode non-coating portion, which are provided on two portions spaced other on the positive electrode sheet, the negative electrode non-coating portion comprises a first negative electrode non-coating portion disposed between opposite side portions of the negative electrode sheet and second and third negative electrode non-coating portions, which are respectively disposed on the opposite side portions of the negative electrode sheet, and the first positive electrode non-coating portion and the first negative electrode non-coating portion are disposed at positions corresponding to each other.

The positive electrode tab may comprise a first positive electrode tab disposed on the first positive electrode non-coating portion and a second positive electrode tab disposed on the second positive electrode non-coating portion, and the negative electrode tab may comprise a first negative electrode tab disposed on the first negative electrode non-coating portion, a second negative electrode tab disposed on the second negative electrode non-coating portion, and a third negative electrode tab disposed on the third negative electrode non-coating portion.

The electrode assembly may be for a lithium ion secondary battery, the positive electrode sheet, the separator, and the negative electrode sheet may be alternately stacked to be wound, a first negative electrode insulation tape may be further attached to the first negative electrode non-coating portion to cover the first negative electrode tab, and a lithium ion deposition prevention tape may be further attached to a portion of the positive electrode sheet facing the first negative electrode insulation tape to prevent lithium ions from being accumulated to be deposited when charging and discharging.

The separator may comprise an insulation material having pores through which the lithium ions move, and each of the first negative electrode insulation tape and the lithium ion deposition prevention tape may comprise an insulation material.

The positive electrode sheet may have opposite side portions, in each of the positive electrode sheet and the negative electrode sheet, a first side portion of the opposite side portions may be wound in a clockwise direction to be disposed at a winding outer portion, and a second side portion of the opposite side portions may be disposed at a winding central portion, and the first positive electrode non-coating portion and the second positive electrode non-coating portion may be disposed between the opposite side portions on the positive electrode sheet, wherein the first positive electrode non-coating portion is disposed on a side of the first side portion of the positive electrode sheet.

A first surface of opposite surfaces of each of the positive electrode sheet and the negative electrode sheet may be disposed inward during the winding, and a second surface of the opposite surfaces may be disposed outward from the winding side.

The positive electrode may have opposite side portions, each of the positive electrode sheet and the negative electrode sheet may be wound from a second side portion of the opposite side portions thereof so as to be wound toward a first side portion of the opposite side portions in a clockwise direction, wherein the second side portion may be disposed at a winding central portion, and the first side portion may be disposed at a winding outer portion, and each of the first positive electrode non-coating portion and the second positive electrode non-coating portion may be disposed between the opposite side portions on the positive electrode sheet, wherein the first positive electrode non-coating portion is disposed at a side of the first side portion of the positive electrode sheet.

A first surface of opposite surfaces of each of the positive electrode sheet and the negative electrode sheet may be disposed outward during the winding, and a second surface of the opposite surfaces may be disposed inward from the winding side.

The lithium ion deposition prevention tape may be disposed on the second surface of the positive electrode sheet, the lithium ion deposition prevention tape may be disposed on a surface of the positive electrode active material portion stacked between the first side portion of the positive electrode sheet and the first positive electrode non-coating portion that is disposed close to the first side portion of the positive electrode sheet.

The separator may comprise: a first separator disposed between the positive electrode sheet and the negative electrode sheet; and a second separator disposed on the negative electrode sheet such that the negative electrode sheet is between the first separator and the second separator, wherein the first negative electrode non-coating portion and the lithium ion deposition prevention tape face each other with the second separator therebetween.

The first positive electrode tab and the first negative electrode tab may be disposed so as not to overlap each other with respect to a direction in which the positive electrode sheet and the negative electrode sheet face each other.

The first positive electrode tab may protrude toward a first side with respect to a direction parallel to the winding central axis, the first negative electrode tab may protrude toward a second side with respect to the direction parallel to the winding central axis, and ends of the first positive electrode tab and the first negative electrode tab may be disposed to be spaced a predetermined distance from each other with respect to the direction parallel to the winding central axis so as not to overlap each other.

Also, a secondary battery according to an embodiment of the present invention comprises an electrode assembly described above and a battery case configured to accommodate the electrode assembly.

Also, an electrode assembly according to a second embodiment of the present invention comprises: a positive electrode sheet comprising a positive electrode active material portion that is an area on which a positive electrode active material is stacked on a positive electrode collector and a positive electrode non-coating portion that is an area on which the positive electrode active material is not stacked; a positive electrode tab disposed on the positive electrode non-coating portion; a negative electrode sheet comprising a negative electrode active material portion that is an area on which a negative electrode active material is stacked on a negative electrode collector and a negative electrode non-coating portion that is an area on which the negative electrode active material is not stacked; a negative electrode tab disposed on the negative electrode non-coating portion; and a separator configured to insulate the positive electrode sheet and the negative electrode sheet from each other, wherein the positive electrode non-coating portion comprises a first positive electrode non-coating portion and a second positive electrode non-coating portion, which are provided on two portions spaced apart from each other on the positive electrode sheet, the negative electrode non-coating portion comprises a first negative electrode non-coating portion disposed between opposite side portions of the negative electrode sheet and second and third negative electrode non-coating portions, which are respectively disposed on the opposite side portions of the negative electrode sheet, and the second positive electrode non-coating portion and the first negative electrode non-coating portion are disposed at positions corresponding to each other.

The positive electrode sheet may have opposite side portions, in each of the positive electrode sheet and the negative electrode sheet, a first side portion of the opposite side portions may be wound in a clockwise direction to be disposed at a winding outer portion, and a second side portion of the opposite side portions may be disposed at a winding central portion, and the first positive electrode non-coating portion and the second positive electrode non-coating portion may be disposed between the opposite side portions on the positive electrode sheet, wherein the first positive electrode non-coating portion is disposed on a side of the first side portion of the positive electrode sheet.

Furthermore, an electrode assembly according to a third embodiment of the present invention comprises: a positive electrode sheet comprising a positive electrode active material portion that is an area on which a positive electrode active material is stacked on a positive electrode collector and a positive electrode non-coating portion that is an area on which the positive electrode active material is not stacked; a positive electrode tab disposed on the positive electrode non-coating portion; a negative electrode sheet comprising a negative electrode active material portion that is an area on which a negative electrode active material is stacked on a negative electrode collector and a negative electrode non-coating portion that is an area on which the negative electrode active material is not stacked; a negative electrode tab disposed on the negative electrode non-coating portion; and a separator configured to insulate the positive electrode sheet and the negative electrode sheet from each other, wherein the positive electrode non-coating portion comprises a first positive electrode non-coating portion disposed on the positive electrode sheet, and the negative electrode non-coating portion comprises a first negative electrode non-coating portion disposed on the negative electrode sheet, wherein the first positive electrode non-coating portion and the first negative electrode non-coating portion are disposed at positions corresponding to each other, and the positive electrode tab comprises a first positive electrode tab disposed on the first positive electrode non-coating portion, and the negative electrode tab comprises a first negative electrode tab disposed on the first negative electrode non-coating portion, wherein the first positive electrode tab and the first negative electrode tab are disposed so as not to overlap each other with respect to a direction in which the positive electrode sheet and the negative electrode sheet face each other.

The first positive electrode tab may protrude toward a first side with respect to a direction parallel to the winding central axis, the first negative electrode tab may protrude toward a second side with respect to the direction parallel to the winding central axis, and ends of the first positive electrode tab and the first negative electrode tab may be disposed to be spaced a predetermined distance from each other with respect to the direction parallel to the winding central axis so as not to overlap each other.

Also, an electrode assembly according to a fourth embodiment of the present invention comprises: a positive electrode plate comprising a positive electrode active material portion on which a positive electrode active material is applied on a first surface of a positive electrode collector and a first positive electrode non-coating portion that is an area on which the positive electrode active material is not applied; a positive electrode tab attached to the first positive electrode non-coating portion; a negative electrode plate comprising a negative electrode active material portion on which a negative electrode active material is applied on a first surface of a negative electrode collector facing the first surface of the positive electrode collector and a first negative electrode non-coating portion that is an area on which the negative electrode active material is not applied; and a separator disposed between the positive electrode plate and the negative electrode plate, wherein the first positive electrode non-coating portion comprises a first positive electrode non-coating portion and a second positive electrode portion disposed at a first end and a second end of the positive electrode plate in a longitudinal direction of the positive electrode plate, respectively, and the first negative electrode non-coating portion is disposed at a position overlapping the first positive electrode non-coating portion, the first negative electrode non-coating portion is disposed between a second negative electrode non-coating portion and a third negative electrode non-coating portion, which are respectively disposed on opposite side portions of the negative electrode plate, and to which a negative electrode tab is attached, and the electrode assembly further comprises a negative electrode tab disposed on the first negative electrode non-coating portion.

The electrode assembly may be an electrode assembly for a lithium ion secondary battery, the positive electrode plate, the separator, and the negative electrode plate may be alternately stacked to be wound, a first negative electrode insulation tape may be further attached to the first negative electrode non-coating portion to cover the negative electrode tab attached to the first negative electrode non-coating portion, and a lithium ion deposition prevention tape may be further attached to a portion of the positive electrode plate facing the first negative electrode insulation tape to prevent lithium ions from being accumulated to be deposited when charging and discharging.

The first negative electrode non-coating portion and the lithium ion deposition prevention tape may face each other with the separator therebetween, and the lithium ion deposition prevention tape may be disposed on a surface of the positive electrode active material portion of the positive electrode plate.

The positive electrode tab attached to the first positive electrode non-coating portion and the negative electrode tab attached to the first negative electrode non-coating portion may be disposed so as not to overlap each other with respect to a direction in which the positive electrode plate and the negative electrode plate face each other.

Advantageous Effects

According to the present invention, the number of electrode tabs may increase to reduce the resistance. Here, the number of negative electrode tabs may increase so that the number of negative electrode tabs is larger than that of positive electrode tabs, thereby minimizing the resistance.

In addition, according to the present invention, the negative electrode non-coating portion on which the additional negative electrode tab and the positive electrode non-coating portion on which the positive electrode tab is disposed may be disposed at the positions corresponding to each other to minimize the capacity loss. Here, the end of the positive electrode tab disposed on the positive electrode non-coating portion and the end of the added negative electrode tab may be spaced a predetermined distance from each other to avoid the overlapping between the positive electrode tab and the negative electrode tab in the direction in which the positive electrode sheet and the negative electrode sheet face each other. Therefore, when the positive electrode sheet and the negative electrode sheet are wound, it is possible to prevent the positive electrode sheet and the negative electrode sheet from being unevenly wound.

Also, the lithium ion deposition prevention tape may be disposed on the portion of the positive electrode sheet facing the negative electrode insulation tape covering the added negative electrode tab to prevent the lithium ion from being accumulated to be deposited.

MODE FOR CARRYING OUT THE INVENTION

Figure 1:
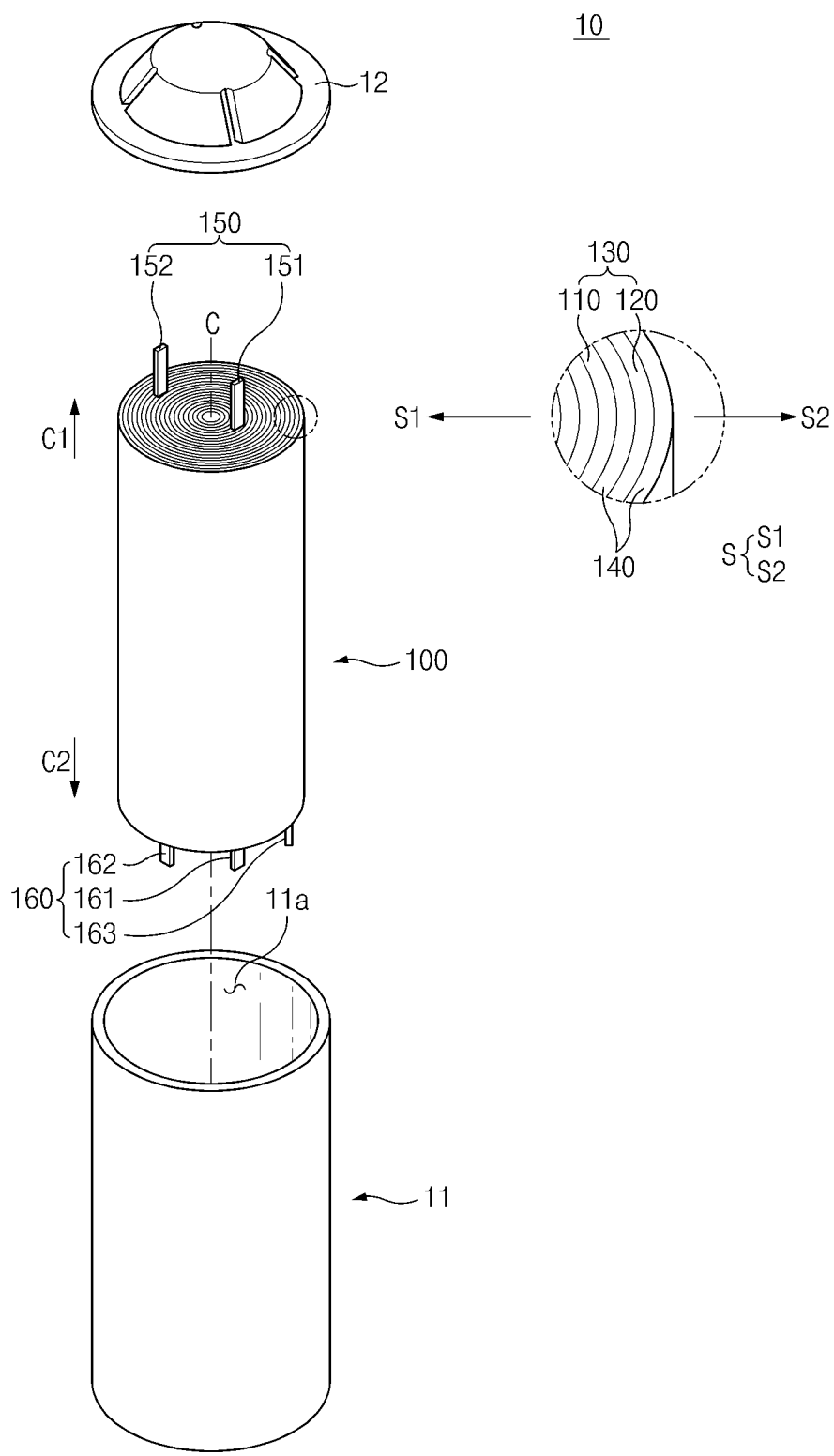
FIG. 1 is an exploded perspective view of a secondary battery to which an electrode assembly is applied according to a first embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
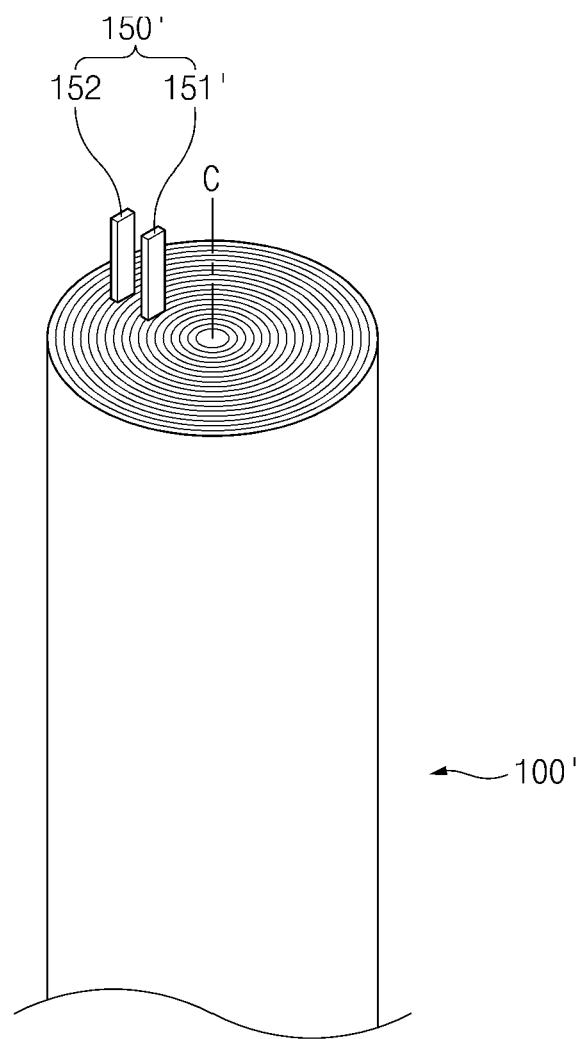
FIG. 2 is a partial perspective view illustrating another example of an arrangement of a positive electrode tab in the electrode assembly according to the first embodiment of the present invention.
Figure 3:
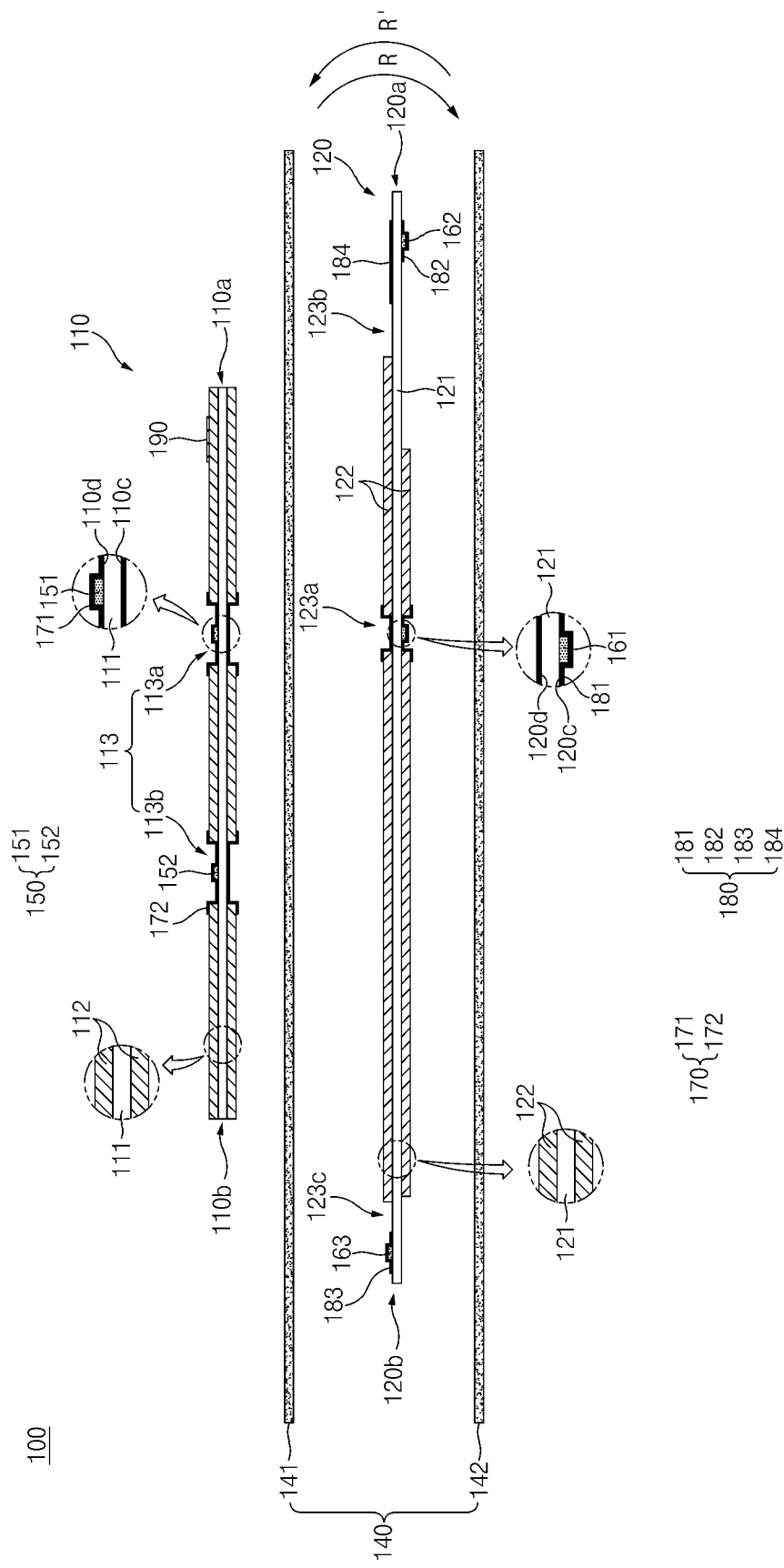
FIG. 3 is a front view illustrating an unfolded state before the electrode assembly is wound according to the first embodiment of the present invention.

FIG. 1 is an exploded perspective view of a secondary battery to which an electrode assembly is applied according to a first embodiment of the present invention, FIG. 2 is a partial perspective view illustrating another example of an arrangement of a positive electrode tab in the electrode assembly according to the first embodiment of the present invention, and FIG. 3 is a front view illustrating an unfolded state before the electrode assembly is wound according to the first embodiment of the present invention.

Referring to FIGS. 1 and 3, an electrode assembly 100 according to a first embodiment of the present invention comprises a positive electrode sheet 110 comprising a positive electrode active material portion 112 and a positive electrode non-coating portion 113, a positive electrode tab 150 provided on the positive electrode non-coating portion 113, a negative electrode sheet 120 comprising a negative electrode active material portion 122 and a negative electrode non-coating portion 123, a negative electrode tab 160 provided on the negative electrode non-coating portion 123, and a separator 140 provided between the positive electrode sheet 110 and the negative electrode sheet 120.

Figure 4:
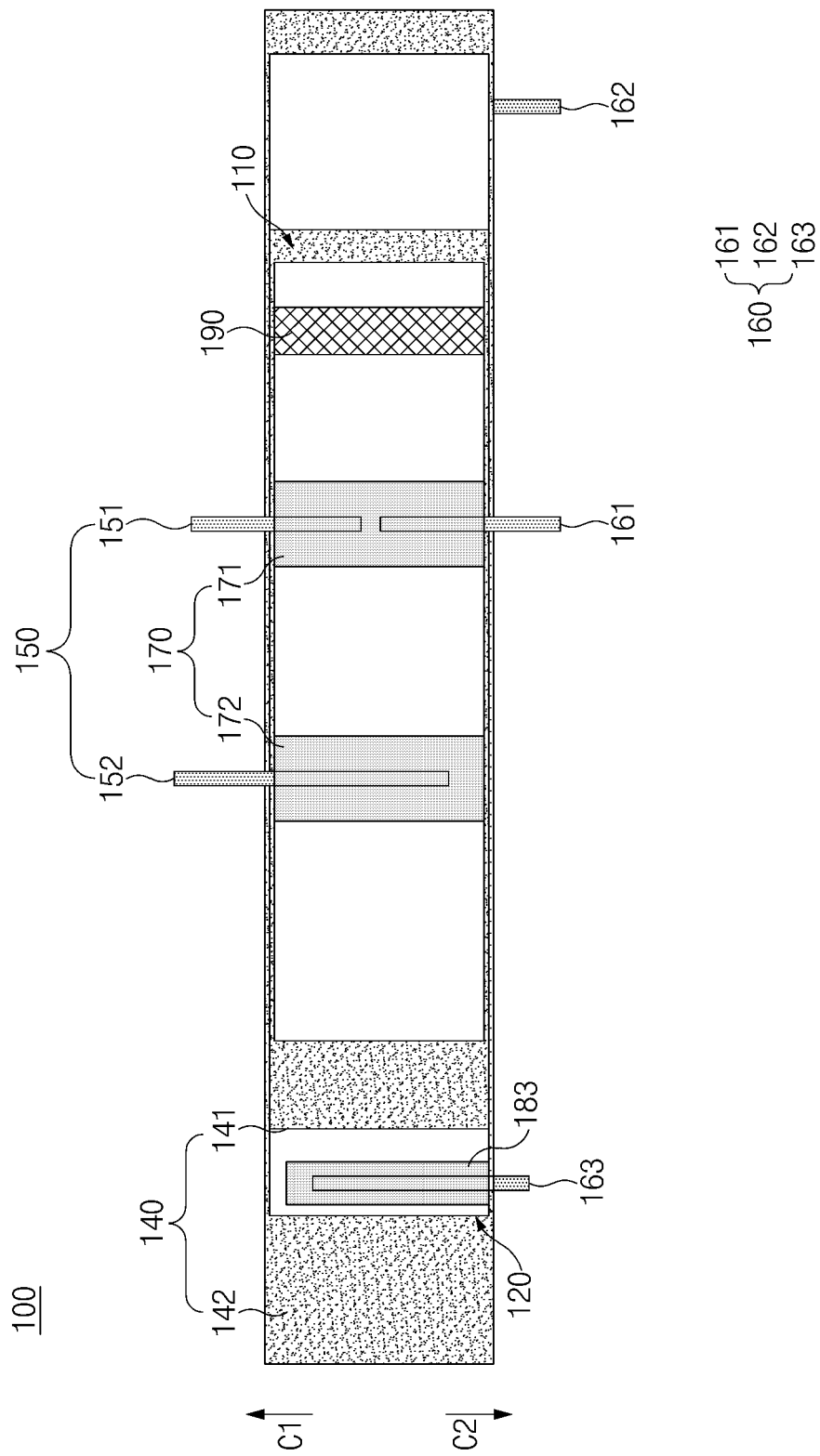
FIG. 4 is a plan view illustrating a stacked state before the electrode assembly is wound according to the first embodiment of the present invention.
Figure 5:
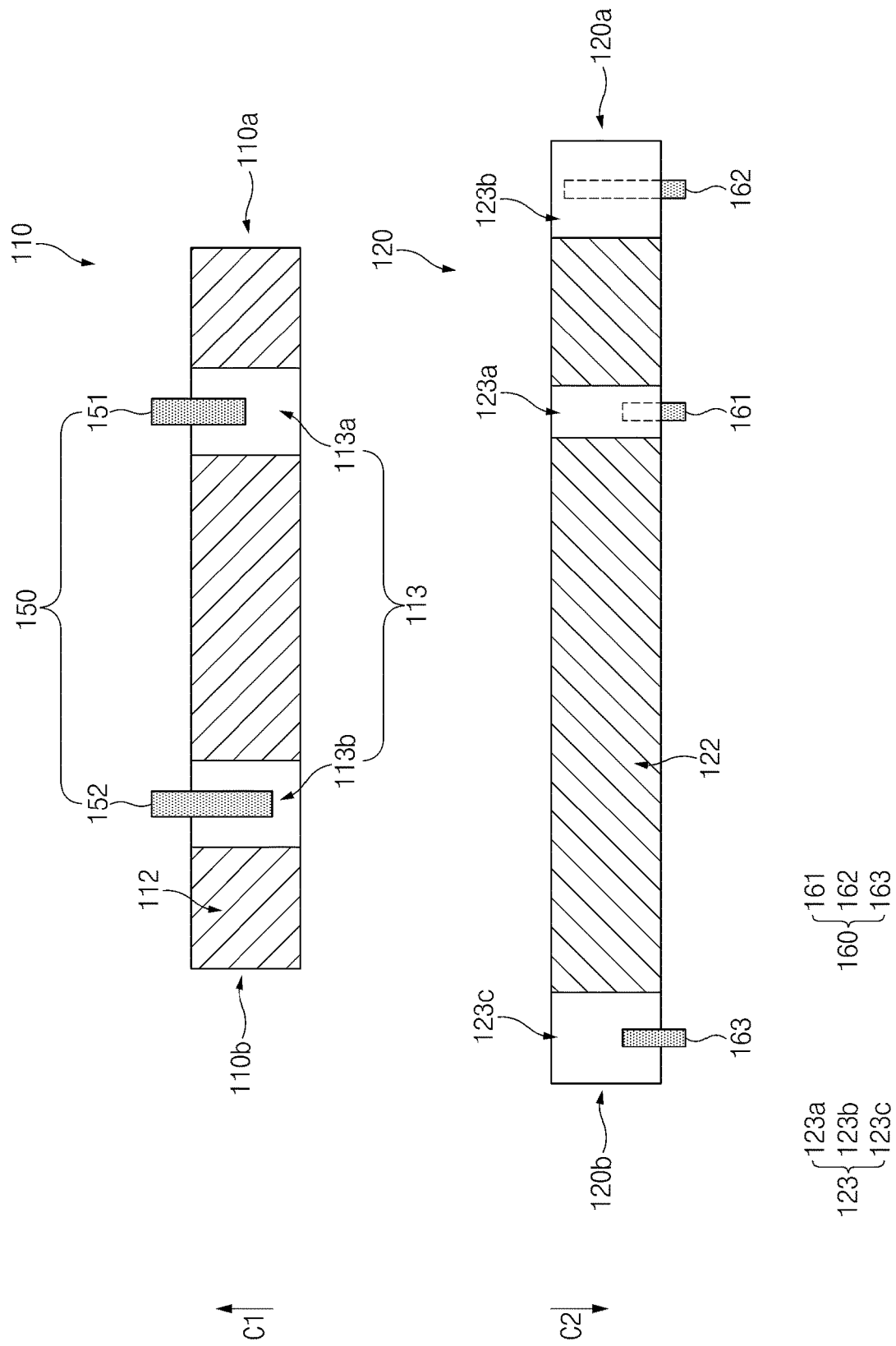
FIG. 5 is a plan view illustrating an unfolded state before a positive electrode sheet and a negative electrode sheet are wound in the electrode assembly according to the first embodiment of the present invention.
Figure 6:
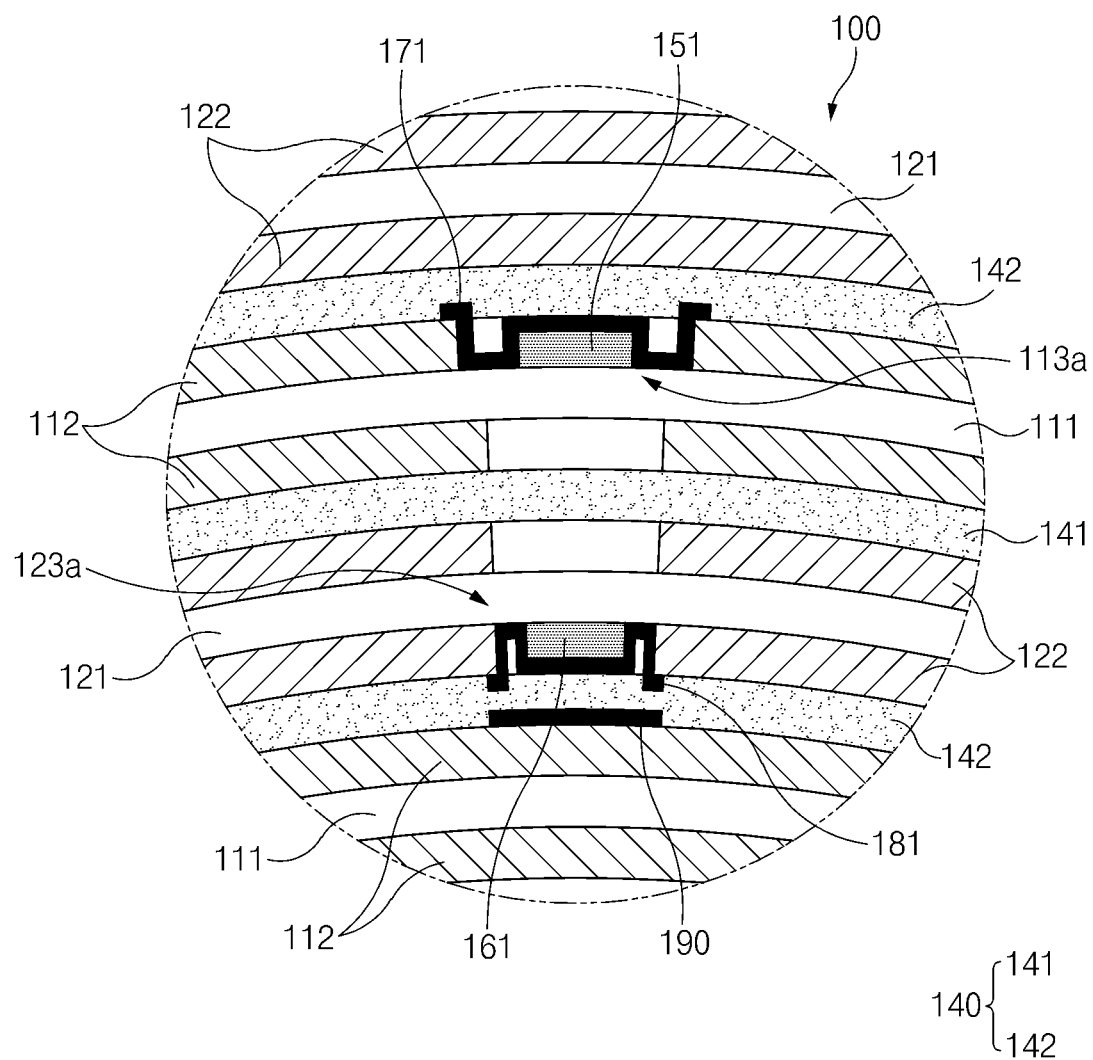
FIG. 6 is a front view illustrating a main part in the state in which the electrode assembly is wound according to the first embodiment of the present invention.

FIG. 4 is a plan view illustrating a stacked state before the electrode assembly is wound according to the first embodiment of the present invention, FIG. 5 is a plan view illustrating an unfolded state before the positive electrode sheet 110 and the negative electrode sheet 120 are wound in the electrode assembly according to the first embodiment of the present invention, and FIG. 6 is a front view illustrating a main part in the state in which the electrode assembly is wound according to the first embodiment of the present invention.

Hereinafter, the electrode assembly according to the first embodiment of the present invention will be described in more detail with reference to FIGS. 1 to 6.

Referring to FIGS. 1 and 3, the electrode assembly 100 may be a chargeable and dischargeable power generation element and have a structure in which an electrode 130 and a separator 140 are combined and alternately stacked with each other. Here, the electrode assembly 100 may be an electrode assembly for a lithium ion secondary battery and may have a wound shape.

The electrode 130 may comprise the positive electrode sheet 110 and the negative electrode sheet 120. Also, the separator 140 may electrically insulate the positive electrode sheet 110 from the negative electrode sheet 120.

Also, the positive electrode sheet 110 and the negative electrode sheet 120 may be alternately stacked and wound together with the separator 140 and may be formed in a roll shape. Here, the electrode assembly 100 may be, for example, wound in a circular or oval shape so as to be formed in a jelly roll type.

Referring to FIGS. 3 to 5, the positive electrode sheet 110 may comprise a positive electrode active material portion 112 that is an area on which a positive electrode active material is stacked on a positive electrode collector 111 and a positive electrode non-coating portion 113 that is an area on which a positive electrode active material is not stacked.

Here, the positive electrode sheet 110 may be disposed, for example, in the form of a sheet.

For example, the positive electrode collector 111 may be provided as foil made of an aluminum (Al) material.

The positive electrode active material portion 112 may comprise a positive electrode active material stacked on one or more surfaces of one surface 110c or the other surface 110d of the positive electrode sheet 110. Here, the positive electrode active material portion 112 may be disposed, for example, on both surfaces of the positive electrode sheet 120. Also, the positive electrode active material portion 112 may further comprise a binder and a conductive material in addition to the positive electrode active material.

The positive electrode active material may comprise lithium manganese oxide, lithium cobalt oxide, lithium nickel oxide, lithium iron phosphate, or a compound containing at least one of these and mixtures thereof.

For another example, the positive electrode active material may comprise a Hi Ni-based positive electrode material. Here, the Hi Ni-based positive electrode material may comprise one or more of a LiNiMnCoO-based material, a LiNiCoAl-based material, and a LiMiMnCoAl-based material.

For example the binder may comprise one of polyfluoro vinylidene, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, and fluoro rubber.

For example, the conductive material may comprise one of: graphite; carbon black such as acetylene black, Ketjen black, channel black, furnace black, lamp black, and thermal black; conductive fibers such as carbon fiber and metal fiber; metal powder such as carbon fluorine, aluminum, and nickel powder; conductive whisker such as zinc oxide and potassium titanate; conductive oxide such as titanium oxide; and polyphenylene derivatives.

The positive electrode non-coating portion 113 may be divided into two portions spaced apart from each other and thus may comprise a first positive electrode non-coating portion 113a and a second positive electrode non-coating portion 113b. Here, the positive electrode non-coating portion 113 may be disposed on at least one surface of both surfaces of the positive electrode sheet 110.

The first positive electrode non-coating portion 113a and the second positive electrode non-coating portion 113b may be disposed between both sides in a longitudinal direction of the positive electrode sheet 110.

Here, for example, the first positive electrode non-coating portion 113a may be disposed close to one side portion 110a of the positive electrode sheet 110, and the second positive electrode non-coating portion 113b may be disposed close to the other side portion 110b of the positive electrode sheet 110.

Also, the first positive electrode non-coating portion 113a may be disposed at a side of a winding outer portion, and the second positive electrode non-coating portion 113b may be disposed at a side of a winding central portion when the positive electrode sheet 110 is wound. The present invention is not necessarily limited thereto. For example, the first positive electrode non-coating portion 113a may be disposed at the side of the winding central portion, and the second positive electrode non-coating portion 113b may be disposed at the side of the winding outer portion when the positive electrode sheet 110 is wound.

The positive electrode tab 150 is provided on the positive electrode non-coating portion 113 of the positive electrode sheet 110. Here, one end of the positive electrode tab 150 may be attached and fixed to the positive electrode non-coating portion 113, and the other end of the positive electrode tab 150 may protrude from the positive electrode sheet 110.

Also, the positive electrode tab 150 may comprise a first positive electrode tab 151 provided on the first positive electrode non-coating portion 113a and a second positive electrode tab 152 provided on the second positive electrode non-coating portion 113b. Here, although the first positive electrode tab 151 and the second positive electrode tab 152 are illustrated as being disposed on the other surface 110d of the positive electrode sheet 110 in FIG. 3, the present invention is not necessarily limited thereto. For example, the first positive electrode tab 151 and the second positive electrode tab 152 may be disposed on one surface 110c or the other surface 110d of the positive electrode sheet 110, respectively. Here, for another example, the first positive electrode tab 151 and the second positive electrode tab 152 may be disposed on the one surface 110c of the positive electrode sheet 110.

Referring to FIG. 1, for example, the first positive electrode tab 151 and the second positive electrode tab 152 may be disposed at both sides of a winding central axis C in the wound electrode assembly 100.

Referring to FIG. 2, in the positive electrode tab 150, a first positive electrode tab 151' and a second positive electrode tab 152 may be disposed at one side with respect to the winding central axis C in an electrode assembly 100' that is wound according to another embodiment. That is, in the winding central axis C, the first positive electrode tab 151' and the second positive electrode tab 152 may be sequentially arranged in a direction of an outer circumferential surface of the electrode assembly 100'. Here, the first positive electrode tab 151' and the second positive electrode tab 152 may be arranged on a line extending in a direction perpendicular to the winding central axis C.

Referring to FIGS. 3 to 5, the negative electrode sheet 120 may comprise a negative electrode active material portion 122 that is an area on which a negative electrode active material is stacked on the negative electrode collector 121 and a negative electrode non-coating portion 123 that is an area on which the negative electrode active material is not stacked. Here, the negative electrode sheet 120 may be provided in, for example, the form of a sheet.

For example, the negative electrode collector 121 may be foil made of a copper (Cu) or nickel (Ni) material.

The negative electrode active material portion 122 may comprise a negative electrode active material stacked on one or more of one surface 120c or the other surface 120d of the negative electrode sheet 120. Here, the negative electrode active material portion 122 may be disposed on, for example, both surfaces of the negative electrode sheet 120. Also, the negative electrode active material portion 122 may further comprise a binder and a conductive material in addition to the negative electrode active material.

For example, the negative electrode active material may be made of a material comprising synthetic graphite.

For another example, the negative electrode active material may comprise lithium a metal, a lithium alloy, carbon, petroleum coke, activated carbon, graphite, a silicon compound, a tin compound, a titanium compound, or an alloy thereof.

The negative electrode non-coating portion 123 may comprise a first negative electrode non-coating portion 123a disposed between both sides in a longitudinal direction of the negative electrode sheet 120 and second and third negative electrode non-coating portions 123b and 123c disposed at both sides of the negative electrode sheet 120. Here, the negative electrode non-coating portion 123 may be disposed on at least one surface of both surfaces of the negative electrode sheet 120.

Referring to FIGS. 3, 5, and 6, the first positive electrode non-coating portion 113a and the first negative electrode non-coating portion 123a may be disposed at positions corresponding to each other.

Referring to FIGS. 3 to 5, the negative electrode tab 160 is disposed on the negative electrode non-coating portion 123. Here, one end of the negative electrode tab 160 may be attached and fixed to the negative electrode non-coating portion 123, and the other end of the negative electrode tab 160 may protrude from the negative electrode sheet 120.

Also, the negative electrode tab 160 comprise a first negative electrode tab 161 provided on the first negative electrode non-coating portion 123a, a second negative electrode tab 162 provided on the second negative electrode non-coating portion 123b, and a third negative electrode tab 163 disposed on the third negative electrode non-coating portion 123c. Here, although the first negative electrode tab 161 and the second negative electrode tab 162 are illustrated as being disposed on the one surface 120c of the negative electrode sheet 120 in FIG. 3, the present invention is not necessarily limited thereto. For example, the first negative electrode tab 161, the second negative electrode tab 162, and the third negative electrode tab 163 may be disposed on the one surface 120c or the other surface 120d of the negative electrode sheet 120, respectively. Here, for another example, the first negative electrode tab 161 and the second negative electrode tab 162 may be disposed on the other surface 120d of the negative electrode sheet 120, and the third negative electrode tab 163 may be disposed on one surface 120c of the negative electrode sheet 120.

Referring to FIGS. 1, 3, and 6, the separator 140 is made of an insulation material and alternately stacked with the positive electrode sheet 110 and the negative electrode sheet 120. Here, the separator 140 may be disposed between the positive electrode sheet 110 and the negative electrode sheet 120 and on outer surfaces of the positive electrode sheet 110 and the negative electrode sheet 120.

Also, the separator 140 may be made of, for example, a material having uniform fine pores. Here, the separator 140 may be, for example, a multi-layer film produced by microporous polyethylene, polypropylene, or a combination thereof or a polymer film for solid polymer electrolytes or gel-type polymer electrolytes such as polyvinylidene fluoride, polyethylene oxide, polyacrylonitrile, or polyvinylidene fluoride hexafluoropropylene copolymers.

Also, the separator 140 may comprise a first separator 141 disposed between the one surface 110c of the positive electrode sheet 110 and the other surface 120d of the negative electrode sheet 120 and a second separator 142 disposed on the one surface 120c of the negative electrode sheet 120.

Referring to FIGS. 1, 4, and 5, the first positive electrode tab 151 and the first negative electrode tab 161 may be disposed so as not to overlap each other with respect to a direction in which the positive electrode sheet 110 and the negative electrode sheet 120 face each other. Here, the direction in which the positive electrode sheet 110 and the negative electrode sheet 120 face each other may be, for example, a side direction S of the winding central axis C.

Also, the first positive electrode tab 151 may protrude in one side direction C1 with respect to a direction parallel to the winding central axis C, which is a central axis around which the electrode assembly 100 is wound, and the first negative electrode tab 161 may protrude in the other side direction C2 with respect to the direction parallel to the winding central axis C. Here, referring to FIG. 1, for example, the first positive electrode tab 151 may protrude upward from the electrode assembly 100 so as to be connected to a cap assembly 12, and the first negative electrode tab 161 may protrude downward from the electrode assembly 100 so as to be connected to an inner bottom surface of the battery case 11.

Also, ends of the first positive electrode tab 151 and the first negative electrode tab 161 may be spaced a predetermined distance from each other with respect to the direction parallel to the winding central axis C so as not to overlap each other.

Referring to FIGS. 1, 3, and 6, one surface 110c and 120c of both surfaces of each of the positive electrode sheet 110 and the negative electrode sheet 120 may disposed inward S1 during the winding, and the other surface 110d and 120d of both surface of each of the positive electrode sheet 110 and the negative electrode sheet 120 may be disposed outward S2 from the winding side. Here, the first positive electrode tab 151 may be disposed on the other surface 110d of the positive electrode sheet 110, and the first negative electrode tab 161 may be disposed on the one surface 120c of the negative electrode sheet 120.

Also, in the positive electrode sheet 110 and the negative electrode sheet 120, for example, the one side portions 110a and 120a thereof may be wound to be disposed at the winding outer portion, and the other side portions 110b and 120b may be disposed at the winding central portion. Here, the positive electrode sheet 110 and the negative electrode sheet 120 may be wound around the other side portions 110b and 120b. Here, the winding central portion may be a central region after the positive electrode sheet 110 and the negative electrode sheet 120 are wound, and the winding outer portion may be an outer region after the positive electrode sheet 110 and the negative electrode sheet 120 are wound. Here, referring to FIG. 3, a winding direction R of the positive electrode sheet 110 and the negative electrode sheet 120 may be, for example, a clockwise direction. That is, in the positive electrode sheet 110 and the negative electrode sheet 120, the one side portions 110a and 120a may be wound in a clockwise direction with respect to the other side portions 110b and 120b.

However, the present invention is not necessarily limited thereto. For another example, in the positive electrode sheet 110 and the negative electrode sheet 120, the one side portions 110a and 120a of both the sides may be wound to be disposed at the winding central portion, and the other side portions 110b and 120b may be disposed at the winding outer portion. Here, the positive electrode sheet 110 and the negative electrode sheet 120 may be wound around the one side portions 110a and 120a. That is, the positive electrode sheet 110 and the negative electrode sheet 120 may be wound in a direction opposite to that of the above-described example. Here, a winding direction R' of the positive electrode sheet 110 and the negative electrode sheet 120 may be, for example, a counterclockwise direction.

Also, the first positive electrode non-coating portion 113a and the second positive electrode non-coating portion 113b may be disposed between both sides of the positive electrode sheet 110, and the first positive electrode non-coating portion 113a may be disposed on the one side portion 110a of the positive electrode sheet 110.

Referring to FIGS. 3 and 4, in the electrode assembly 100 according to the first embodiment of the present invention, a positive electrode insulation tape 170 may be further attached to the positive electrode non-coating portion 113 to cover the positive electrode tab 150, and a negative electrode insulation tape 180 may be further attached to the negative electrode non-coating portion 123 to cover the negative electrode tab 160. Here, the positive electrode insulation tape 170 made of an insulation material and a negative electrode insulation tape 180 made of an insulation material are provided to cover the positive electrode tab 150 and the negative electrode tab 160, thereby preventing the separator 140 from being ruptured by edges of the positive electrode tab 150 and the negative electrode tab 160 and also preventing short circuit from occurring due to direct contact between the positive electrode tab 150 and the negative electrode sheet 120 or direct contact between the negative electrode tab 160 and the positive electrode sheet 110 through the damaged portion when the separator is damaged.

The positive electrode insulation tape 170 may comprise a first positive electrode insulation tape 171 attached to the first positive electrode non-coating portion 113a to cover the first positive electrode tab 151 and a second positive electrode insulation tape 182 attached to the second positive electrode non-coating portion 113b to cover the second positive electrode tab 152.

The negative electrode insulation tape 180 may comprise a first negative electrode insulation tape 181 attached to the first negative electrode non-coating portion 123a to cover the first negative electrode tab 161, a second negative electrode insulation tape 182 attached to the second negative electrode non-coating portion 123b to cover the second negative electrode tab 162, and a third negative electrode insulation tape 183 attached to the third negative electrode non-coating portion 123c to cover the third negative electrode tab 163. Also, the negative electrode insulation tape 180 may further comprise a fourth negative electrode insulation tape 184 attached to a surface opposite to the surface on which the second negative electrode tab 162 is disposed on the second negative electrode non-coating portion 123b. That is, the second negative electrode non-coating portion 123b may be disposed on both sides of the negative electrode sheet 120. Here, the second negative electrode tab 162 may be disposed on one surface of the second negative electrode non-coating portion 123b, and the fourth negative electrode insulation tape 184 may be disposed on the other surface of the second negative electrode non-coating portion 123b.

Also, each of the positive electrode insulation tape 170 and the negative electrode insulation tape 180 may comprise an electrical insulation material. Here, the positive electrode insulation tape 170 and the negative electrode insulation tape 180 may not have pores through which lithium ions are movable. Thus, the positive electrode insulation tape 170 and the negative electrode insulation tape 180 may be made of a material that is resistant to the physical damage and thus may not be damaged by the edges of the positive electrode tab 150 and the negative electrode tab 160. In addition, portions of the separator 140 facing the positive electrode tab 150 and the negative electrode tab 160 may be prevented from being damaged.

The positive electrode insulation tape 170 and the negative electrode insulation tape 180 may comprise, for example, a base material (not shown) and an adhesion layer (not shown) disposed on one surface of the base material.

Referring to FIGS. 3 and 6, in the electrode assembly 100 according to the first embodiment of the present invention, a lithium ion deposition prevention tape 190 may be further attached on a portion of the positive electrode sheet 110 which faces the first negative electrode insulation tape 181 with the separator 140 therebetween. Here, the lithium ion deposition prevention tape 190 may be provided on, for example, the other surface 110d of the positive electrode sheet 110, particularly, disposed on a surface of the positive electrode active material 112 stacked between the one side portion 110a of the positive electrode sheet 110 and the first positive electrode non-coating portion 113a that is disposed close to the one side portion 110a of the positive electrode sheet 110. Here, the lithium ion deposition prevention tape 190 and the first negative electrode non-coating portion 123a may face each other with the second separator 142 therebetween. Also, the lithium ion deposition prevention tape 190 may be made of an electrical insulation material.

Thus, the lithium ion deposition prevention tape 190 may be disposed on a portion of the positive electrode sheet 110 facing the first negative electrode non-coating portion 123a, to which the first negative electrode insulation tape 181 is attached, to prevent lithium ions, which are not exchanged, from being accumulated to be deposited during the charging and discharging.

That is, the lithium ion deposition prevention tape 190 may be attached to the surface of the positive electrode active material portion 112 of the positive electrode sheet 110 facing the first negative electrode insulation tape 181 to prevent the lithium ions from being accumulated to be deposited on the portion at which the lithium ions are not exchanged by the first negative electrode insulation tape 181 when the lithium ion are exchanged to perform the charging and the discharging.

In more detail, the separator 140 may have a thin film form and be disposed between the positive electrode sheet 110 and the negative electrode sheet 120 to prevent the positive electrode sheet 110 and the negative electrode sheet 120 from directly contacting each other. Here, the lithium ions may move through the fin pores of the separator 140 to perform the charging and the discharging. Here, the first negative electrode insulation tape 181 is made of an insulation material having no fine pores, and thus, the lithium ions do not move therethrough. Here, the lithium ions that do not move by being blocked by the first negative electrode insulation tape 181 may be accumulated to be deposited on the surface of the positive electrode active material portion 112 of the positive electrode sheet 110 facing the first t negative electrode insulation tape 181. Thus, in the electrode assembly 100 according to the first embodiment of the present invention, the lithium ion deposition prevention tape made of the insulation material may be attached to the surface of the positive electrode active material portion 112 of the positive electrode sheet 110 to prevent facing the first negative electrode insulation tape 181 to prevent the lithium ions from being accumulated on the surface of the positive electrode active material portion 112 facing the first negative electrode insulation tape 181.

The lithium ion deposition prevention tape 190 may be made of, for example, polyimide (PI).

Also, the lithium ion deposition prevention tape 190 may comprise, for example, a base material (not shown) and an adhesion layer (not shown) disposed on one surface of the base material.

Referring to FIG. 3, the electrode assembly 100 according to the first embodiment of the present invention configured as described above may reduce resistance by adding the first negative electrode tab 161 such that the number of negative electrode tabs 160 is greater than that of the positive electrode tabs 150.

Here, the first negative electrode non-coating portion 123a may be additionally provided to attach the first negative electrode tab 161, and the first negative electrode non-coating portion 123a may be disposed to correspond to the first positive electrode non-coating portion 113a on which the first positive electrode tab 151 is disposed, thereby preventing or significantly reducing the additional loss of the battery capacity. That is, when the negative electrode non-coating portion is additionally provided, if the positive electrode non-coating portion is additionally provided on the positive electrode sheet 110 to correspond to the formation of the first negative electrode non-coating portion 123a, the positive electrode active material portion 122 may be reduced to decrease in battery capacity. Therefore, the first negative electrode non-coating portion 123a may match the first positive electrode non-coating portion 113a on which the first positive electrode tab 151 is disposed so that the positive electrode non-coating portion is additionally provided, thereby significantly reducing or preventing the decrease of the battery capacity.

Hereinafter, an electrode assembly according to a second exemplary embodiment of the present invention will be described.

Figure 7:
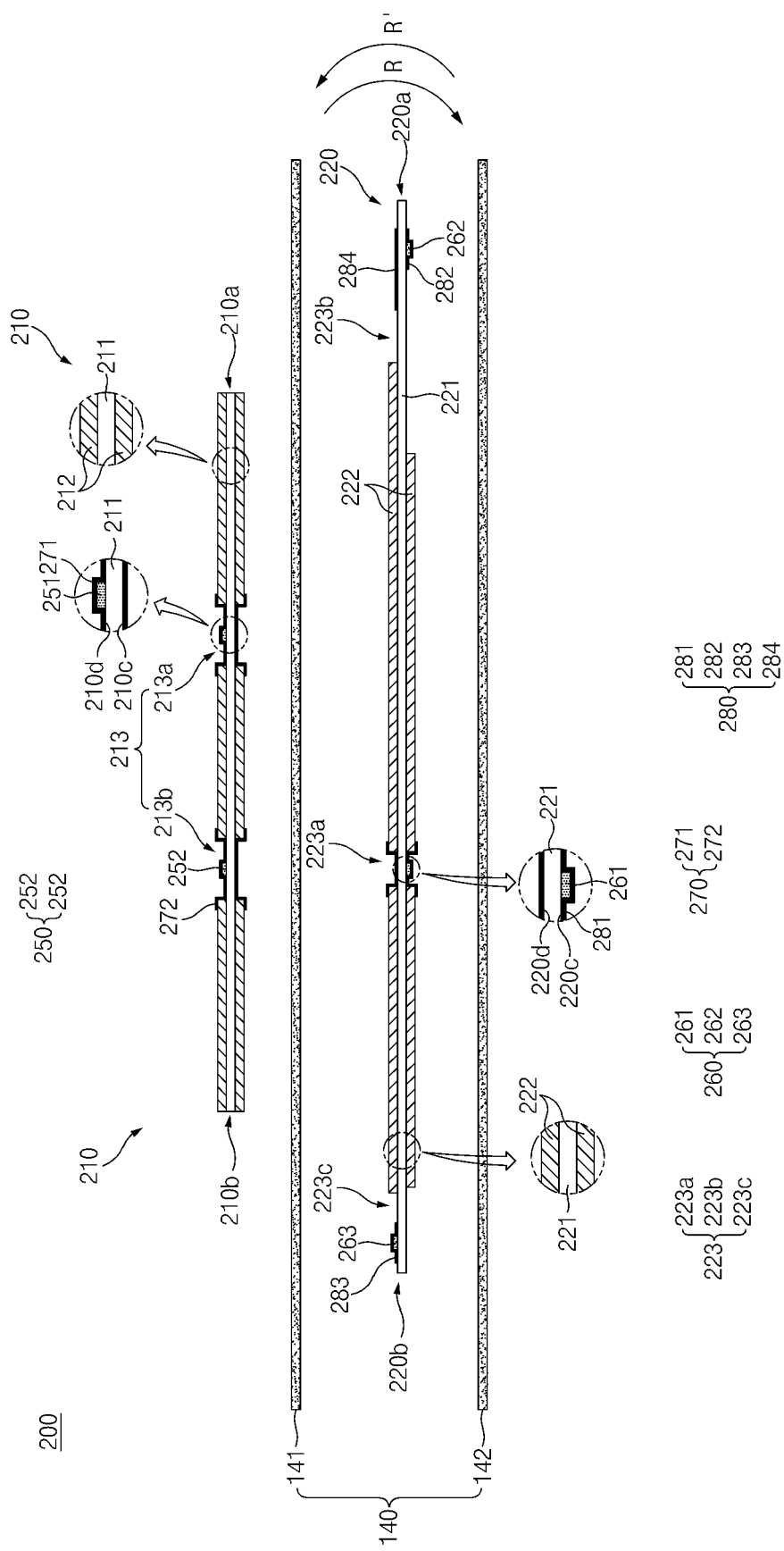
FIG. 7 is a front view illustrating an unfolded state before an electrode assembly is wound according to a second embodiment of the present invention.

FIG. 7 is a front view illustrating an unfolded state before an electrode assembly is wound according to a second embodiment of the present invention.

Referring to FIG. 7, an electrode assembly 200 according to a second embodiment of the present invention comprises a positive electrode sheet 210 comprising a positive electrode active material portion 212 and a positive electrode non-coating portion 213, a positive electrode tab 250 provided on the positive electrode non-coating portion 213, a negative electrode sheet 220 comprising a negative electrode active material portion 222 and a negative electrode non-coating portion 223, a negative electrode tab 260 provided on the negative electrode non-coating portion 223, and a separator 140 provided between the positive electrode sheet 210 and the negative electrode sheet 220.

The electrode assembly 200 according to the second embodiment of the present invention is different from the electrode assembly 100 according to the first embodiment of the present invention in positions of the positive electrode non-coating portion 213 and the negative electrode non-coating portion 223. Thus, this embodiment briefly describes the contents overlapping with the above-described embodiment and will be described based on the differences.

In more detail, the positive electrode sheet 210 may comprise a positive electrode active material portion 212 that is an area on which a positive electrode active material is stacked on a positive electrode collector 211 and a positive electrode non-coating portion 213 that is an area on which the positive electrode active material is not stacked.

The positive electrode non-coating portion 213 may be divided into two portions spaced apart from each other and thus may comprise a first positive electrode non-coating portion 213a and a second positive electrode non-coating portion 213b. Here, the positive electrode non-coating portion 213 may be disposed on at least one surface of both surfaces of the positive electrode sheet 210.

The first positive electrode non-coating portion 213a and the second positive electrode non-coating portion 213b may be disposed between both sides in a longitudinal direction of the positive electrode sheet 210.

Here, for example, the first positive electrode non-coating portion 213a may be disposed close to the other side portion 210b of the positive electrode sheet 210, and the second positive electrode non-coating portion 213b may be disposed close to one side portion 210a of the positive electrode sheet 210.

Also, the first positive electrode non-coating portion 213a may be disposed at a side of a winding outer portion, and the second positive electrode non-coating portion 213b may be disposed at a side of a winding central portion when the positive electrode sheet 210 is wound. The present invention is not necessarily limited thereto. For example, the first positive electrode non-coating portion 213a may be disposed at the side of the winding central portion, and the second positive electrode non-coating portion 213b may be disposed at the side of the winding outer portion when the positive electrode sheet 210 is wound.

The positive electrode tab 250 is provided on the positive electrode non-coating portion 213 of the positive electrode sheet 210. Here, one end of the positive electrode tab 250 may be attached and fixed to the positive electrode non-coating portion 213, and the other end of the positive electrode tab 150 may protrude from the positive electrode sheet 210.

Also, the positive electrode tab 250 may comprise a first positive electrode tab 251 provided on the first positive electrode non-coating portion 213a and a second positive electrode tab 252 provided on the second positive electrode non-coating portion 213b.

The negative electrode sheet 220 may comprise a negative electrode active material portion 222 that is an area on which a negative electrode active material is stacked on the negative electrode collector 221 and a negative electrode non-coating portion 223 that is an area on which the negative electrode active material is not stacked.

The negative electrode non-coating portion 223 may comprise a first negative electrode non-coating portion 223a disposed between both sides in a longitudinal direction of the negative electrode sheet 220 and second and third negative electrode non-coating portions 223b and 223c disposed at both sides of the negative electrode sheet 220. Here, the negative electrode non-coating portion 223 may be disposed on at least one surface of both surfaces of the negative electrode sheet 220.

The first positive electrode non-coating portion 213b and the first negative electrode non-coating portion 223a may be disposed corresponding to each other.

The negative electrode tab 260 is disposed on the negative electrode non-coating portion 223. Here, one end of the negative electrode tab 260 may be attached and fixed to the negative electrode non-coating portion 223, and the other end of the negative electrode tab 160 may protrude from the negative electrode sheet 220.

Also, the negative electrode tab 260 may comprise a first negative electrode tab 261 provided on the first negative electrode non-coating portion 223a, a second negative electrode tab 262 provided on the second negative electrode non-coating portion 123b, and a third negative electrode tab 263 disposed on the third negative electrode non-coating portion 123c.

In the electrode assembly 200 according to the second embodiment of the present invention, a positive electrode insulation tape 270 may be further attached to the positive electrode non-coating portion 213 to cover the positive electrode tab 250, and a negative electrode insulation tape 280 may be further attached to the negative electrode non-coating portion 223 to cover the negative electrode tab 260.

The positive electrode insulation tape 270 may comprise a first positive electrode insulation tape 271 attached to the first positive electrode non-coating portion 213a to cover the first positive electrode tab 251 and a second positive electrode insulation tape 272 attached to the second positive electrode non-coating portion 213b to cover the second positive electrode tab 252.

The negative electrode insulation tape comprise a first negative electrode insulation tape 281 attached to the first negative electrode non-coating portion 223a to cover the first negative electrode tab 261, a second negative electrode insulation tape 282 attached to the second negative electrode non-coating portion 223b to the second negative electrode tab 262, and a third negative electrode insulation tape 283 attached to the third negative electrode non-coating portion 223c to cover the third negative electrode tab 263. Also, the negative electrode insulation tape 280 may further comprise a fourth negative electrode insulation tape 284 attached to a surface opposite to the surface on which the second negative electrode tab 262 is disposed on the second negative electrode non-coating portion 223b. That is, the second negative electrode non-coating portion 223b may be disposed on both sides of the negative electrode sheet 220. Here, the second negative electrode tab 262 may be disposed on one surface of the second negative electrode non-coating portion 223b, and the fourth negative electrode insulation tape 284 may be disposed on the other surface of the second negative electrode non-coating portion 223b.

Hereinafter, an electrode assembly according to a third embodiment will be described with reference to FIGS. 8 and 9.

Figure 8:
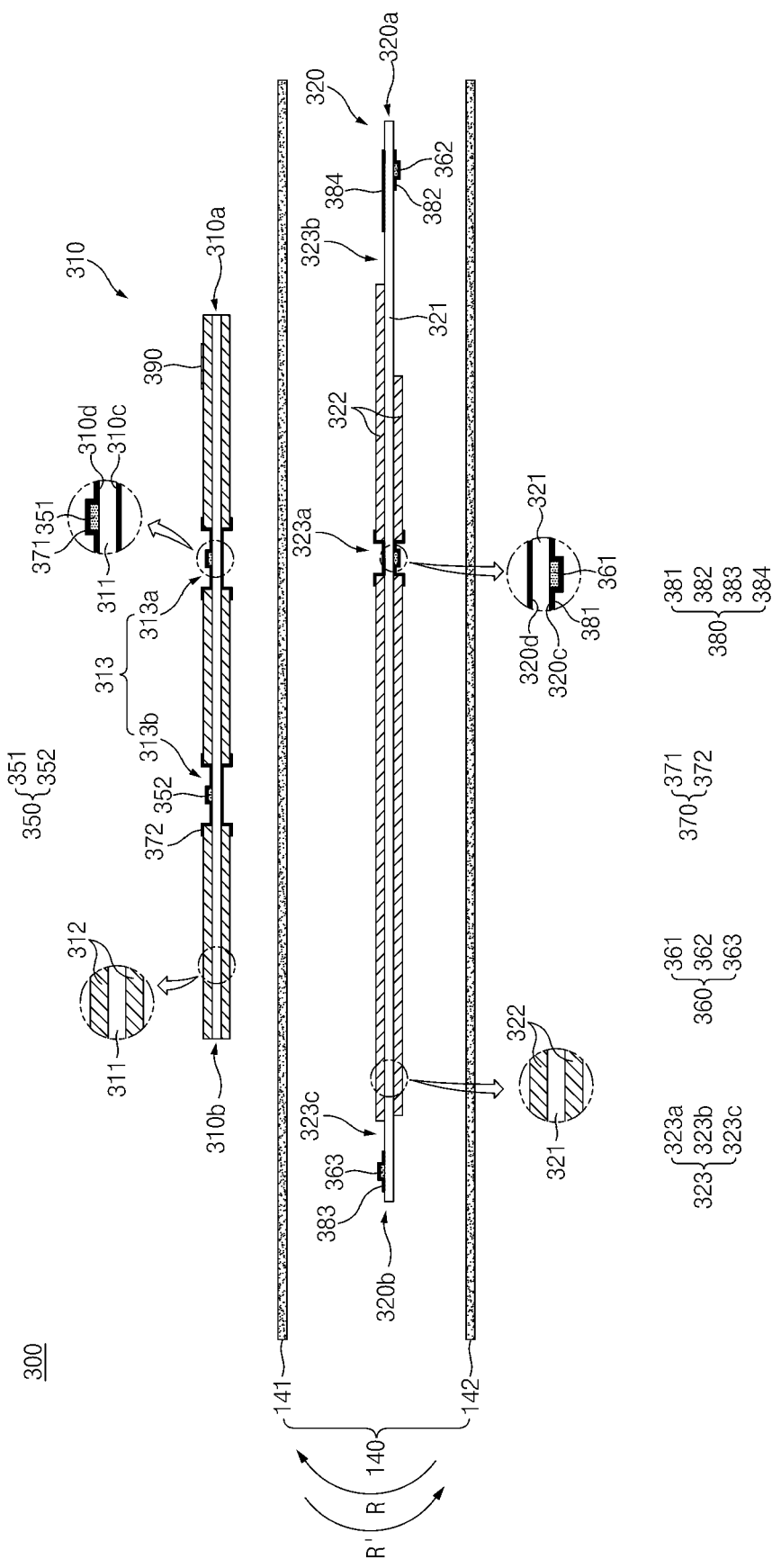
FIG. 8 is a front view illustrating an unfolded state before an electrode assembly is wound according to a third embodiment of the present invention.
Figure 9:
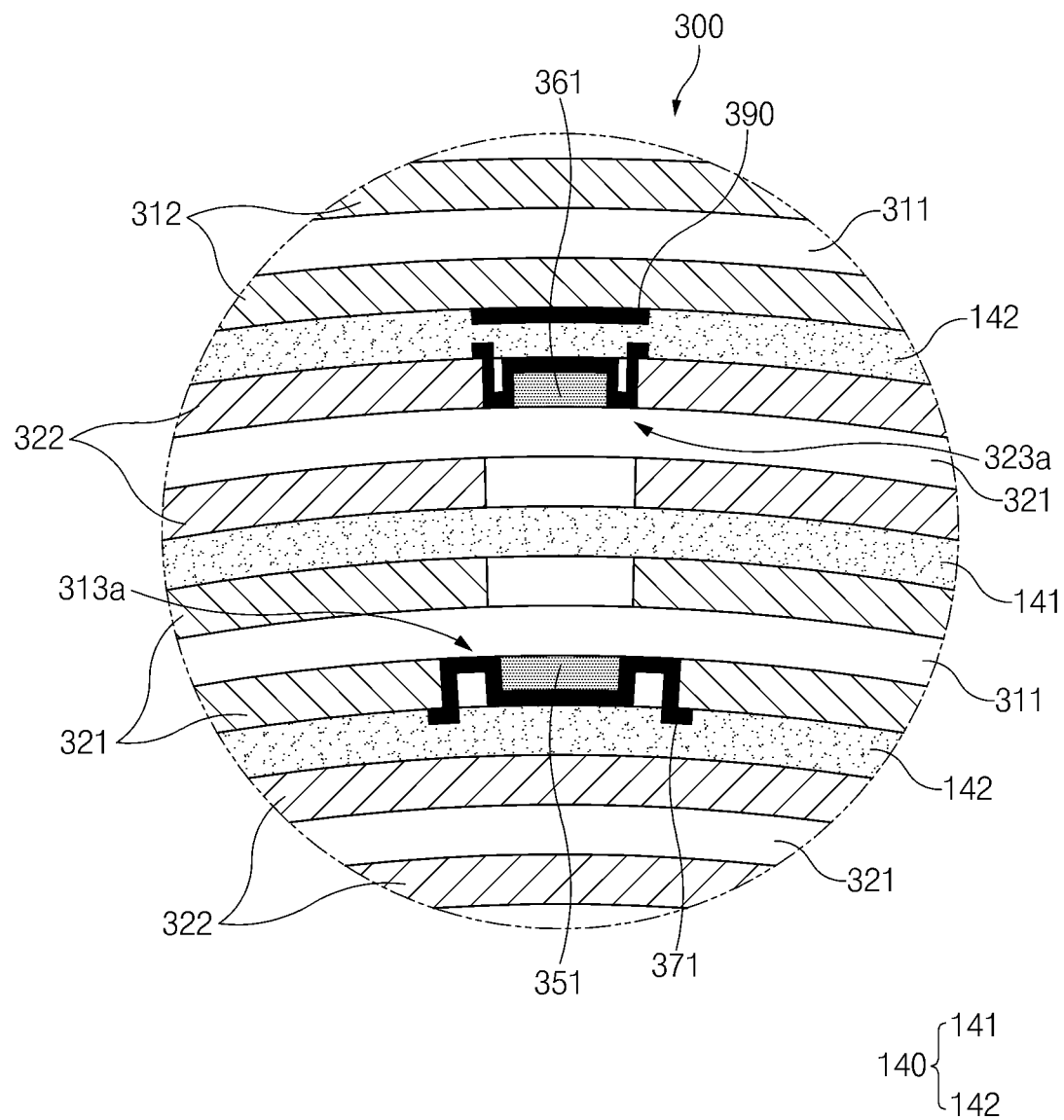
FIG. 9 is a front view illustrating a main part in the state in which the electrode assembly is wound according to the third embodiment of the present invention.

FIG. 8 is a front view illustrating an unfolded state before an electrode assembly is wound according to a third embodiment of the present invention, and FIG. 9 is a front view illustrating a main part in the state in which the electrode assembly is wound according to the third embodiment of the present invention.

Referring to FIGS. 8 and 9, an electrode assembly 300 according to a third embodiment of the present invention comprises a positive electrode sheet 310 comprising a positive electrode active material portion 312 and a positive electrode non-coating portion 313, a positive electrode tab 350 provided on the positive electrode non-coating portion 313, a negative electrode sheet 320 comprising a negative electrode active material portion 322 and a negative electrode non-coating portion 323, a negative electrode tab 360 provided on the negative electrode non-coating portion 323, and a separator 140 provided between the positive electrode sheet 310 and the negative electrode sheet 320.

The electrode assembly 300 according to the third embodiment of the present invention is different from the electrode assembly 100 according to the first embodiment and the electrode assembly according to the second embodiment in winding shape. Thus, this embodiment briefly describes the contents overlapping with the above-described embodiment and will be described based on the differences.

In more detail, the positive electrode sheet 310 may comprise a positive electrode active material portion 312 that is an area on which a positive electrode active material is stacked on a positive electrode collector 311 and a positive electrode non-coating portion 113 that is an area on which a positive electrode active material is not stacked.

The positive electrode non-coating portion 313 may be divided into two portions spaced apart from each other and thus may comprise a first positive electrode non-coating portion 313a and a second positive electrode non-coating portion 313b. Here, the positive electrode non-coating portion 313 may be disposed on at least one surface of both surfaces of the positive electrode sheet 310.

The first positive electrode non-coating portion 313a and the second positive electrode non-coating portion 313b may be disposed between both sides in a longitudinal direction of the positive electrode sheet 310.

Here, for example, the first positive electrode non-coating portion 313a may be disposed close to one side portion 310a of the positive electrode sheet 310, and the second positive electrode non-coating portion 113b may be disposed close to the other side portion 310b of the positive electrode sheet 310.

Also, the first positive electrode non-coating portion 313a may be disposed at a side of a winding central portion, and the second positive electrode non-coating portion 313b may be disposed at a side of a winding outer portion when the positive electrode sheet 310 is wound. However, the present invention is not necessarily limited thereto. For example, the first positive electrode non-coating portion 313a may be disposed at the side of the winding outer portion, and the second positive electrode non-coating portion 313b may be disposed at the side of the winding central portion when the positive electrode sheet 310 is wound.

The positive electrode tab 350 is provided on the positive electrode non-coating portion 313 of the positive electrode sheet 310. Here, one end of the positive electrode tab 350 may be attached and fixed to the positive electrode non-coating portion 313, and the other end of the positive electrode tab 150 may protrude from the positive electrode sheet 310.

Also, the positive electrode tab 350 may comprise a first positive electrode tab 351 provided on the first positive electrode non-coating portion 313a and a second positive electrode tab 352 provided on the second positive electrode non-coating portion 313b. Here, for example, the first positive electrode tab 351 and the second positive electrode tab 352 may be disposed on the other surface 310d of the positive electrode sheet 310.

Here, although the first positive electrode tab 351 and the second positive electrode tab 352 are illustrated as being disposed on the other surface 110d of the positive electrode sheet 310 in FIG. 9, the present invention is not necessarily limited thereto. For example, the first positive electrode tab 351 and the second positive electrode tab 352 may be disposed on one surface 310c or the other surface 310d of the positive electrode sheet 310, respectively. Here, for another example, the first positive electrode tab 351 and the second positive electrode tab 352 may be disposed on the one surface 310c of the positive electrode sheet 310.

The negative electrode sheet 320 may comprise a negative electrode active material portion 322 that is an area on which a negative electrode active material is stacked on the negative electrode collector 321 and a negative electrode non-coating portion 323 that is an area on which the negative electrode active material is not stacked.

The negative electrode non-coating portion 323 may comprise a first negative electrode non-coating portion 323a disposed between both sides in a longitudinal direction of the negative electrode sheet 320 and second and third negative electrode non-coating portions 323b and 323c disposed at both sides of the negative electrode sheet 320. Here, the negative electrode non-coating portion 323 may be disposed on at least one surface of both surfaces of the negative electrode sheet 320.

The first positive electrode non-coating portion 313b and the first negative electrode non-coating portion 323a may be disposed corresponding to each other.

The negative electrode tab 360 is disposed on the negative electrode non-coating portion 323. Here, one end of the negative electrode tab 360 may be attached and fixed to the negative electrode non-coating portion 323, and the other end of the negative electrode tab 160 may protrude from the negative electrode sheet 320.

Also, the negative electrode tab 360 may comprise a first negative electrode tab 361 provided on the first negative electrode non-coating portion 323a, a second negative electrode tab 362 provided on the second negative electrode non-coating portion 323b, and a third negative electrode tab 363 disposed on the third negative electrode non-coating portion 323c. Here, although the first negative electrode tab 361 and the second negative electrode tab 362 are illustrated as being disposed on the one surface 320c of the negative electrode sheet 320 in FIG. 8, the present invention is not necessarily limited thereto. For example, the first negative electrode tab 361, the second negative electrode tab 362, and the third negative electrode tab 363 may be disposed on the one surface 320c or the other surface 320d of the negative electrode sheet 320, respectively. Here, for another example, the first negative electrode tab 361 and the second negative electrode tab 362 may be disposed on the other surface 320d of the negative electrode sheet 320, and the third negative electrode tab 363 may be disposed on the one surface 320c of the negative electrode sheet 320.

The one surfaces 310c and 320c of both the surfaces of the positive electrode sheet 310 and the negative electrode sheet 320 may be disposed outward during the winding, and the other surfaces 310d and 320d may be disposed inward from the winding side. Here, the first positive electrode tab 351 may be disposed on the other surface 110d of the positive electrode sheet 310, and the first negative electrode tab 361 may be disposed on the one surface 320c of the negative electrode sheet 320.

Also, in the positive electrode sheet 310 and the negative electrode sheet 320, for example, the other side portions 310b and 320b of both the side portions may be wound to be disposed at a winding central portion, and one side portions 310a and 320a may be wound to be disposed at a winding outer portion. Here, the positive electrode sheet 310 and the negative electrode sheet 320 may be wound from the other side portions 310b and 320b so as to be wound in direction of the one side portions 310a and 320a, i.e., wound in a clockwise direction. Here, the winding direction R of the positive electrode sheet 310 and the negative electrode sheet 320 may be, for example, a clockwise direction.

However, the present invention is not necessarily limited thereto. For another example, in the positive electrode sheet 310 and the negative electrode sheet 320, the one side portions 310a and 320a of both the sides may be wound to be disposed at the winding central portion, and the other side portions 310a 320a be disposed at the winding outer portion. Here, the positive electrode sheet 310 and the negative electrode sheet 320 may be wound around the other side portions 310b and 320b. That is, the positive electrode sheet 310 and the negative electrode sheet 320 may be wound in a direction opposite to that of the above-described example. Here, a winding direction R' of the positive electrode sheet 310 and the negative electrode sheet 320 may be, for example, a counterclockwise direction.

In the electrode assembly 300 according to the third embodiment of the present invention, a positive electrode insulation tape 370 may be further attached to the positive electrode non-coating portion 313 to cover the positive electrode tab 350, and a negative electrode insulation tape 380 may be further attached to the negative electrode non-coating portion 323 to cover the negative electrode tab 360.

The positive electrode insulation tape 370 may comprise a first positive electrode insulation tape 371 attached to the first positive electrode non-coating portion 313a to cover the first positive electrode tab 351 and a second positive electrode insulation tape 372 attached to the second positive electrode non-coating portion 313b to cover the second positive electrode tab 352.

The negative electrode insulation tape 380 may comprise a first negative electrode insulation tape 381 attached to the first negative electrode non-coating portion 323a to cover the first negative electrode tab 361, a second negative electrode insulation tape 382 attached to the second negative electrode non-coating portion 323b to the second negative electrode tab 362, and a third negative electrode insulation tape 383 attached to the third negative electrode non-coating portion 323c to cover the third negative electrode tab 363. Also, the negative electrode insulation tape 380 may further comprise a fourth negative electrode insulation tape 384 attached to a surface opposite to the surface on which the second negative electrode tab 362 is disposed on the second negative electrode non-coating portion 323b. That is, the second negative electrode non-coating portion 323b may be disposed on both sides of the negative electrode sheet 320. Here, the second negative electrode tab 362 may be disposed on one surface of the second negative electrode non-coating portion 323b, and the fourth negative electrode insulation tape 384 may be disposed on the other surface of the second negative electrode non-coating portion 323b.

In the electrode assembly 300 according to the first embodiment of the present invention, a lithium ion deposition prevention tape 390 may be further attached on a portion of the positive electrode sheet 310 which: faces the first negative electrode insulation tape 381 with the separator 140 therebetween.

Hereinafter, a secondary battery comprising the electrode assembly according to an embodiment of the present invention will be described with reference to FIGS. 1 to 6.

Referring to FIGS. 1 and 2, a secondary battery 10 according to an embodiment of the present invention comprises an electrode assembly 100 and a battery case 11 accommodating the electrode assembly 100. Here, the electrode assembly 100 comprises a positive electrode sheet 110 comprising a positive electrode active material portion 112 and a positive electrode non-coating portion 113, a positive electrode tab 150 provided on the positive electrode non-coating portion 113, a negative electrode sheet 120 comprising a negative electrode active material portion 122 and a negative electrode non-coating portion 123, a negative electrode tab 160 provided on the negative electrode non-coating portion 123, and a separator 140 provided between the positive electrode sheet 110 and the negative electrode sheet 120.

The secondary battery according to an embodiment of the present invention relates to the secondary battery 10 comprising the electrode assembly according to the first to third embodiments. This embodiment briefly describes the contents overlapping with the above-described embodiment, and will be described based on the differences.

In more detail, referring to FIG. 1, in the secondary battery 10 according to an embodiment of the present invention, the battery case 11 may have an accommodation part 11a that accommodates an electrolyte and the electrode assembly 100 therein. Here, the battery case 11 may be opened in a shape in which the accommodation part 11a is opened to one side. Also, a cap assembly 12 may be further provided to cover the opened one side of the battery case 11. Here, the battery case 11 may have, for example, an oval shape or a cylindrical shape.

Also, the electrode assembly 100 may be a chargeable and dischargeable power generation element and have a structure in which an electrode 130 and a separator 140 are combined and alternately stacked. Here, the electrode assembly 100 may be an electrode assembly for a lithium ion secondary battery and may have a wound shape.

The electrode 130 may comprise the positive electrode sheet 110 and the negative electrode sheet 120. Also, the separator 140 may electrically insulate the positive electrode sheet 110 from the negative electrode sheet 120.

Referring to FIGS. 1 to 4, the positive electrode sheet 110 may comprise a positive electrode active material portion 112 that is an area on which a positive electrode active material is stacked on a positive electrode collector 111 and a positive electrode non-coating portion 113 that is an area on which a positive electrode active material is not stacked. Here, the positive electrode non-coating portion 113 may be divided into two portions spaced apart from each other on the positive electrode sheet 110 and thus may comprise a first positive electrode non-coating portion 113a and a second positive electrode non-coating portion 113b.

The positive electrode tab 150 is provided on the positive electrode non-coating portion 113 of the positive electrode sheet 110. Here, one end of the positive electrode tab 150 may be attached and fixed to the positive electrode non-coating portion 113, and the other end of the positive electrode tab 150 may protrude from the positive electrode sheet 110. Here, the positive electrode tab 150 may protrude toward a bottom surface of the cap assembly 12 or the battery case 11.

Also, the positive electrode tab 150 may comprise a first positive electrode tab 151 provided on the first positive electrode non-coating portion 113a and a second positive electrode tab 152 provided on the second positive electrode non-coating portion 113b.

The negative electrode sheet 120 may comprise a negative electrode active material portion 122 that is an area on which a negative electrode active material is stacked on the negative electrode collector 121 and a negative electrode non-coating portion 123 that is an area on which the negative electrode active material is not stacked. Here, the negative electrode non-coating portion 123 may comprise a first negative electrode non-coating portion 123a disposed between both sides of the negative electrode sheet 120 and second and third negative electrode non-coating portions 123b and 123c disposed at both sides of the negative electrode sheet 120. Here, the first negative electrode non-coating portion 123a may be disposed on one side portion 120a of the negative electrode sheet 120, and the second negative electrode non-coating portion 123b may be disposed on the other side portion 120b of the negative electrode sheet 120.

The negative electrode tab 160 is disposed on the negative electrode non-coating portion 123. Here, one end of the negative electrode tab 160 may be attached and fixed to the negative electrode non-coating portion 123, and the other end of the negative electrode tab 160 may protrude from the negative electrode sheet 120. Here, the negative electrode tab 160 may protrude toward a bottom surface of the cap assembly 12 or the battery case 11.

Also, the negative electrode tab 160 may comprise a first negative electrode tab 161 provided on the first negative electrode non-coating portion 123a, a second negative electrode tab 162 provided on the second negative electrode non-coating portion 123b, and a third negative electrode tab 163 disposed on the third negative electrode non-coating portion 123c.

Here, the first positive electrode non-coating portion 213b and the first negative electrode non-coating portion 123a may be disposed corresponding to each other.

Also, referring to FIG. 5, the first positive electrode tab 151 and the first negative electrode tab 161 may be disposed so as not to overlap each other with respect to a direction in which the positive electrode sheet 110 and the negative electrode sheet 120 face each other.

Referring to FIGS. 3 and 6, in the electrode assembly 100 of the secondary battery 10 according to an embodiment of the present invention, a first negative electrode insulation tape 181 may be further attached to the first negative electrode non-coating portion 123a to cover the first negative electrode tab 161.

Also, in the electrode assembly 100 of the secondary battery 10 according to an embodiment of the present invention, a lithium ion deposition prevention tape 190 may be further attached to a portion of the positive electrode sheet 10 facing the first negative electrode non-coating portion 123a.

Thus, the lithium ion deposition prevention tape 190 may be disposed on a portion of the positive electrode sheet 110 facing the first negative electrode non-coating portion 123a, to which the first negative electrode insulation tape 181 is attached, to prevent lithium ions, which are not exchanged, from being accumulated to be deposited during the charging and discharging.

That is, the lithium ion deposition prevention tape 190 may be attached to the surface of the positive electrode active material portion 112 of the positive electrode sheet 110 facing the first negative electrode insulation tape 181 to prevent the lithium ions from being accumulated and deposited on the portion at which the lithium ions are not exchanged by the first negative electrode insulation tape 181 when the lithium ion are exchanged to perform the charging and the discharging.

Figure 10:
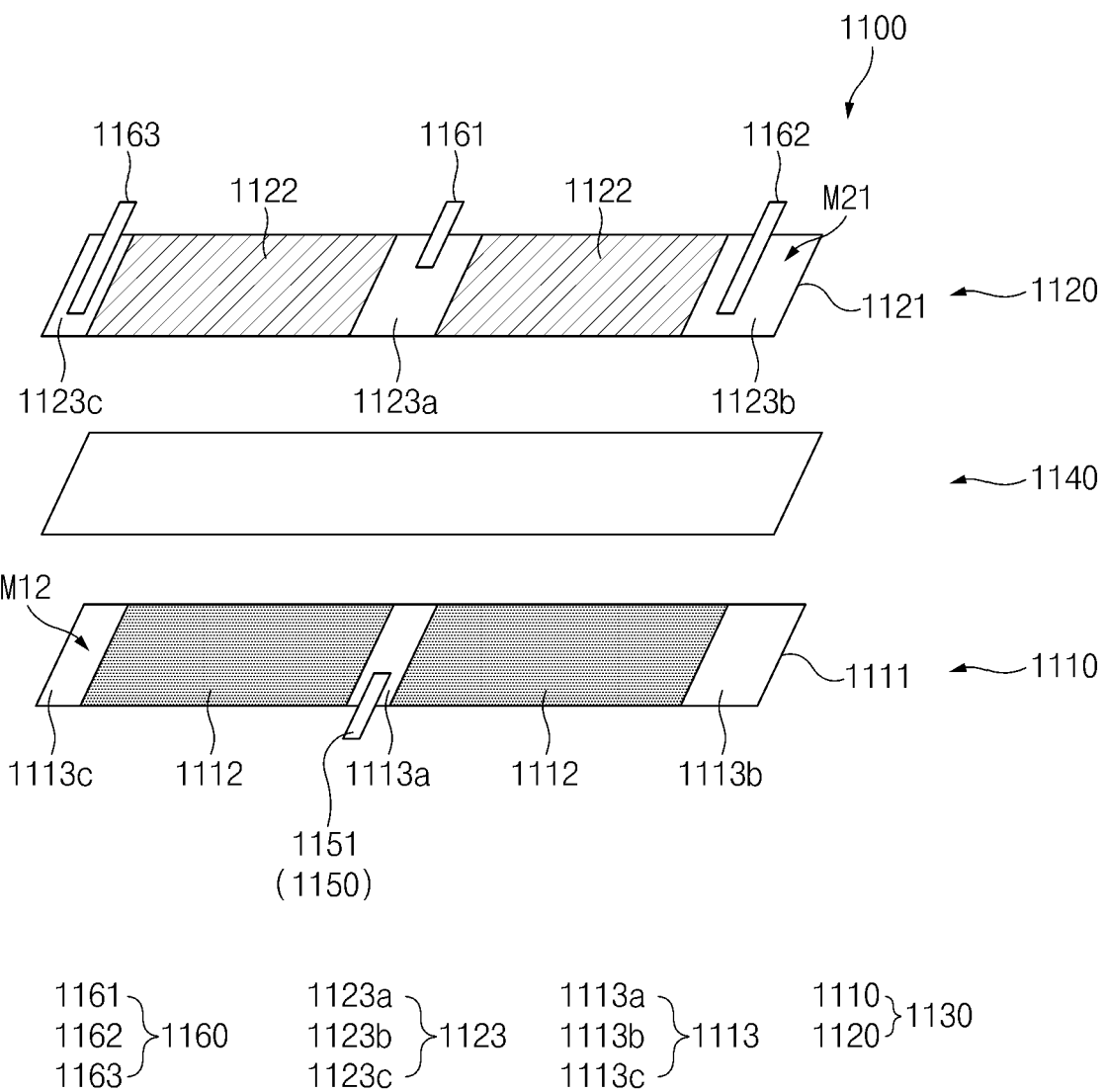
FIG. 10 is a perspective view illustrating an unfolded state before a positive electrode plate and a negative electrode plate are wound in an electrode assembly according to a fourth embodiment of the present invention.

FIG. 10 is a perspective view illustrating an unfolded state before a positive electrode plate and a negative electrode plate are wound in an electrode assembly according to a fourth embodiment of the present invention.

Hereinafter, an electrode assembly according to a fourth embodiment will be described with reference to FIG. 10.

Referring to FIG. 10, an electrode assembly 1100 according to a fourth embodiment of the present invention comprises a positive electrode plate 1110 comprising a positive electrode active material portion 1112 and a positive electrode non-coating portion 1113, a positive electrode tab 1150 disposed on the positive electrode non-coating portion 1113, a negative electrode plate 1120 comprising a negative electrode active material portion 1122 and a negative electrode non-coating portion 1123, a negative electrode tab 1160 disposed on the negative electrode non-coating portion 1123, and a separator 1140 disposed between the positive electrode plate 1110 and the negative electrode plate 1120.

The electrode assembly 1100 may be a chargeable and dischargeable power generation element and have a structure in which an electrode 1130 and the separator 1140 are combined and alternately stacked. Here, the electrode assembly 1100 may be an electrode assembly for a lithium ion secondary battery and may have a wound shape.

The electrode 1130 may comprise the positive electrode plate 1110 and the negative electrode 1120. Also, the separator 1140 may separate the positive electrode plate 1110 and the negative electrode plate 1120 from each other so that the positive electrode plate 1110 and the negative electrode plate 1120 are electrically insulated from each other.

Also, the positive electrode plate 1110 and the negative electrode plate 1120 may be alternately stacked and wound together with the separator 1140 and may be provided in the form of a roll. Here, the electrode assembly 1100 may be, for example, wound in a circular or oval shape so as to be formed in a jelly roll type.

The positive electrode plate 1110 may comprise a positive electrode collector 1111, a positive electrode active material portion 1112 that is an area on which a positive electrode active material is stacked on the positive electrode collector 1111, and a positive electrode non-coating portion 1113 that is an area on which the positive electrode active material is not stacked.

For example, the positive electrode collector 1111 may be provided as foil made of an aluminum (Al) material.

The positive electrode active material portion 1112 may comprise a positive electrode active material stacked on a first surface M12 of the positive electrode collector 1111. Also, the positive electrode active material portion 1112 may further comprise a positive electrode active material stacked on a second surface of the positive electrode collector 1111. Also, the positive electrode active material portion 1112 may further comprise a binder and a conductive material in addition to the positive electrode active material.

For example, the positive electrode non-coating portion 1113 may be divided into two portions spaced apart from each other and thus may comprise a first positive electrode non-coating portion 1113a and a second positive electrode non-coating portion 1113b. Here, the first positive electrode non-coating portion 1113a may be disposed between both ends of the positive electrode plate 1110.

For another example, the positive electrode non-coating portion 1113 may be divided into three portions spaced apart from each other and thus may comprise a first positive electrode non-coating portion 1113a, a second positive electrode non-coating portion 1113b, and a third positive electrode non-coating portion 1113c. Here, the first positive electrode non-coating portion 1113a may be disposed between both ends of the positive electrode plate 1110.

The positive electrode tab 1150 may be disposed on the positive electrode non-coating portion 1113 of the positive electrode plate 1110. Also, the positive electrode tab 1150 may comprise a first positive electrode tab 1151 disposed on the first positive electrode non-coating portion 113a. Here, one end of the first positive electrode tab 1151 may be attached and fixed to the first positive electrode non-coating portion 1113a, and the other end of the first positive electrode tab 1151 may protrude from the positive electrode plate 1110. Furthermore, the positive electrode tab 1150 may further comprise a second positive electrode tab (not shown) disposed on the second positive electrode non-coating portion 1113b.

The negative electrode plate 1210 may comprise a negative electrode collector 1121, a negative electrode active material portion 1122 that is an area on which a negative electrode active material is stacked and a negative electrode non-coating portion 1123 that is an area on which the negative electrode active material is not stacked.

For example, the negative electrode collector 1121 may be foil made of a copper (Cu) or nickel (Ni) material.

The negative electrode active material portion 1122 may comprise a negative electrode active material stacked on a first surface M21 of the negative electrode collector 1121. Here, the first surface M21 of the negative electrode collector may be a surface facing the first surface M12 of the positive electrode collector 1111. That is, although the first surface M21 of the negative electrode collector 1122 is illustrated in the same direction as the first surface M12 of the positive electrode collector 1111, for convenience of description in FIG. 6, the first surface M21 of the negative electrode collector 1121 may be substantially a surface facing the first surface M12 of the positive electrode collector 1111. Also, the negative electrode active material portion 1122 may further comprise a negative electrode active material stacked on a second surface of the negative electrode collector 1121. Also, the negative electrode active material portion 1122 may further comprise a binder and a conductive material in addition to the negative electrode active material.

The negative electrode non-coating portion 1123 may comprise a first negative electrode non-coating portion 1123a disposed between both ends of the negative electrode plate 1120 and second and third negative electrode non-coating portions 1123b and 1123c disposed at both ends of the negative electrode plate 1120.

Also, the first positive electrode non-coating portion 1113b and the first negative electrode non-coating portion 1123a may be disposed corresponding to each other.

The negative electrode tab 1160 is disposed on the negative electrode non-coating portion 1123. Here, one end of the negative electrode tab 1160 may be attached and fixed to the negative electrode non-coating portion 1123, and the other end of the negative electrode tab 1160 may protrude from the negative electrode plate 1120. Also, the negative electrode tab 1160 may comprise a first negative electrode tab 1161 provided on the first negative electrode non-coating portion 1123a, a second negative electrode tab 1152 provided on the second negative electrode non-coating portion 1123b, and a third negative electrode tab 1153 disposed on the third negative electrode non-coating portion 1123c.

The separator 1140 is made of an insulation material and is alternately stacked together with the positive electrode plate 1110 and the negative electrode plate 1120. Here, the separator 1140 may be disposed between the positive electrode plate 1110 and the negative electrode plate 1120 and disposed on an outer surface of the positive electrode plate 1110 or the negative electrode plate 1120.

The first positive electrode tab 1151 and the first negative electrode tab 1161 may be disposed so as not to overlap each other with respect to a direction in which the positive electrode 1110 and the negative electrode 1120 face each other. Here, the direction in which the positive electrode 1110 and the negative electrode 1120 face each other may be, for example, a lateral direction of a winding central axis. Also, ends of the first positive electrode tab 1151 and the first negative electrode tab 1161 may be spaced a predetermined distance from each other with respect to the direction parallel to the winding central axis so as not to overlap each other.

In the electrode assembly 1100 according to the fourth embodiment of the present invention, a positive electrode insulation tape may be further attached to the positive electrode non-coating portion 1113 to cover the positive electrode tab 1150, and a negative electrode insulation tape may be further attached to the negative electrode non-coating portion 1123 to cover the negative electrode tab 1160. Here, the positive electrode insulation tape and the negative electrode insulation tape may be attached in the same manner as that in which the positive electrode insulation tape 170 and the negative electrode insulation tape 180 of the electrode assembly 100 according to the foregoing first embodiment of the present invention are attached.

The positive electrode insulation tape may comprise a first positive electrode insulation tape attached to the first positive electrode non-coating portion 1113a to cover the first positive electrode tab 1151.

The negative electrode insulation tape may comprise a first negative electrode insulation tape attached to the first negative electrode non-coating portion 1213a to cover the first negative electrode tab 161, a second negative electrode insulation tape attached to the second negative electrode non-coating portion 1123b to cover the second negative electrode tab 1162, and a third negative electrode insulation tape attached to the third negative electrode non-coating portion 1123c to cover the third negative electrode tab 1163.

Also, each of the positive electrode insulation tape and the negative electrode insulation tape may comprise an electrical insulation material.

In the electrode assembly 1100 according to the fourth embodiment of the present invention, a lithium ion deposition prevention tape comprising an insulation material may be further attached to a portion of the positive electrode plate 1110 facing the first negative electrode insulation tape with the separator therebetween. Here, the lithium ion deposition prevention tape may be attached in the same manner as that in which the lithium ion deposition prevention tape 190 of the electrode assembly 100 according to the foregoing first embodiment of the present invention are attached. Here, the lithium ion deposition prevention tape may be disposed on a surface of the positive electrode active material portion 1112 of the positive electrode plate 1110. Thus, the lithium ion deposition prevention tape 1190 may be disposed on a portion of the positive electrode plate 1110 facing the first negative electrode non-coating portion 1123a, to which the first negative electrode insulation tape is attached, to prevent lithium ions, which are not exchanged, from being accumulated to be deposited during the charging and discharging.

Manufacturing Example 1-1 Manufacture of Electrode Assembly

A positive electrode non-coating portion was formed on each of two portions of a positive electrode sheet, which are spaced part from each other, to provide positive electrode tabs, and a negative electrode non-coating portion was formed on each of three portions of a negative electrode sheet, which are spaced apart from each other, to provide negative electrode tabs, thereby manufacturing an electrode assembly comprising the two positive electrode tabs and the three negative electrode tabs.

Here, a first positive electrode non-coating portion of the positive electrode non-coating portions disposed on the two portions of the positive electrode sheet and a first negative electrode non-coating portion formed between both side portions of the negative electrode sheet are formed at positions corresponding to each other.

1-2 Manufacture of Secondary Battery

The manufactured electrode assembly was accommodated together with an electrolyte in a battery case to manufacture a secondary battery.

Comparative Example

A secondary battery was manufactured in the same manner as that of the manufacturing example except that a positive electrode non-coating portion was formed on each of two portions of a positive electrode sheet, which are spaced part from each other, to provide positive electrode tabs, and a negative electrode non-coating portion was formed on each of two portions of a negative electrode sheet, which are spaced apart from each other, to provide negative electrode tabs, thereby manufacturing an electrode assembly comprising the two positive electrode tabs and the two negative electrode tabs. Here, according to the comparative example, the negative electrode non-coating portion may be formed on the two portions of the negative electrode sheet, and thus, the first negative electrode non-coating portion formed between both side portions of the negative electrode sheet according to the manufacturing example was not formed.

Experimental Example

Electricity was applied to the secondary battery to measure an effect of improving resistance.

As a result of measuring alternating current (AC) resistance, it was observed that the resistance value measured in the manufacturing example was reduced by about 20% when compared to that measured in the comparative example.

As a result, it may be seen that the resistance is significantly improved in the manufacturing example.

While the present invention has been particularly shown and described with reference to exemplary embodiments thereof, it is to be understood that the scope of the present invention is not limited to the electrode assembly and the secondary battery comprising the same according to the present invention. It will be understood by those of ordinary skill in the art that various changes in form and details may be made therein without departing from the spirit and scope of the invention.

Furthermore, the scope of protection of the present invention will be clarified by the appended claims.

The invention claimed is:

1. An electrode assembly comprising:
a positive electrode sheet comprising a positive electrode active material portion that is an area on which a positive electrode active material is stacked on a positive electrode collector and a positive electrode non-coating portion that is an area on which the positive electrode active material is not stacked;
a positive electrode tab disposed on the positive electrode non-coating portion;
a negative electrode sheet comprising a negative electrode active material portion that is an area on which a negative electrode active material is stacked on a negative electrode collector and a negative electrode non-coating portion that is an area on which the negative electrode active material is not stacked;
a negative electrode tab disposed on the negative electrode non-coating portion; and
a separator configured to insulate the positive electrode sheet and the negative electrode sheet from each other,
wherein the positive electrode sheet, the separator, and the negative electrode sheet are alternately stacked to be wound,
the positive electrode non-coating portion comprises a first positive electrode non-coating portion and a second positive electrode non-coating portion, which are provided on two portions spaced apart from each other on the positive electrode sheet,
the negative electrode non-coating portion comprises a first negative electrode non-coating portion disposed between opposite side portions of the negative electrode sheet and second and third negative electrode non-coating portions, which are respectively disposed on the opposite side portions of the negative electrode sheet,
the first positive electrode non-coating portion and the first negative electrode non-coating portion are disposed at positions corresponding to each other,
the positive electrode tab comprises a first positive electrode tab disposed on the first positive electrode non-coating portion and a second positive electrode tab disposed on the second positive electrode non-coating portion, and
the negative electrode tab comprises a first negative electrode tab disposed on the first negative electrode non-coating portion, a second negative electrode tab disposed on the second negative electrode non-coating portion, and a third negative electrode tab disposed on the third negative electrode non-coating portion.

2. The electrode assembly of claim 1, wherein the electrode assembly is for a lithium ion secondary battery,
a first negative electrode insulation tape is further attached to the first negative electrode non-coating portion to cover the first negative electrode tab, and
a lithium ion deposition prevention tape is further attached to a portion of the positive electrode sheet facing the first negative electrode insulation tape to prevent lithium ions from being accumulated to be deposited when charging and discharging.

3. The electrode assembly of claim 2, wherein the separator comprises an insulation material having pores through which the lithium ions move, and
each of the first negative electrode insulation tape and the lithium ion deposition prevention tape comprises an insulation material.

4. The electrode assembly of claim 2, wherein the positive electrode sheet has opposite side portions,
in each of the positive electrode sheet and the negative electrode sheet, a first side portion of the opposite side portions is wound in a clockwise direction to be disposed at a winding outer portion, and a second side portion of the opposite side portions is disposed at a winding central portion, and
the first positive electrode non-coating portion and the second positive electrode non-coating portion are disposed between the opposite side portions on the positive electrode sheet, wherein the first positive electrode non-coating portion is disposed on a side of the first side portion of the positive electrode sheet.

5. The electrode assembly of claim 4, wherein a first surface of opposite surfaces of each of the positive electrode sheet and the negative electrode sheet is disposed inward during the winding, and a second surface of the opposite surfaces is disposed outward from the winding side.

6. The electrode assembly of claim 2, wherein the positive electrode has opposite side portions,
each of the positive electrode sheet and the negative electrode sheet is wound from a second side portion of the opposite side portions thereof so as to be wound toward a first side portion of the opposite side portions in a clockwise direction, wherein the second side portion is disposed at a winding central portion, and the first side portion is disposed at a winding outer portion, and
each of the first positive electrode non-coating portion and the second positive electrode non-coating portion is disposed between the opposite side portions on the positive electrode sheet, wherein the first positive electrode non-coating portion is disposed at a side of the first side portion of the positive electrode sheet.

7. The electrode assembly of claim 6, wherein a first surface of opposite surfaces of each of the positive electrode sheet and the negative electrode sheet is disposed outward during the winding, and a second surface of the opposite surfaces is disposed inward from the winding side.

8. The electrode assembly of claim 5, wherein the lithium ion deposition prevention tape is disposed on the second surface of the positive electrode sheet,
wherein the lithium ion deposition prevention tape is disposed on a surface of the positive electrode active material portion stacked between the first side portion of the positive electrode sheet and the first positive electrode non-coating portion that is disposed close to the first side portion of the positive electrode sheet.

9. The electrode assembly of claim 8, wherein the separator comprises:
a first separator disposed between the positive electrode sheet and the negative electrode sheet; and
a second separator disposed on the negative electrode sheet such that the negative electrode sheet is between the first separator and the second separator,
wherein the first negative electrode non-coating portion and the lithium ion deposition prevention tape face each other with the second separator therebetween.

10. The electrode assembly of claim 1, wherein the first positive electrode tab and the first negative electrode tab are disposed so as not to overlap each other with respect to a direction in which the positive electrode sheet and the negative electrode sheet face each other.

11. The electrode assembly of claim 10, wherein the first positive electrode tab protrudes toward a first side with respect to a direction parallel to the winding central axis,
the first negative electrode tab protrudes toward a second side with respect to the direction parallel to the winding central axis, and
ends of the first positive electrode tab and the first negative electrode tab are disposed to be spaced a predetermined distance from each other with respect to the direction parallel to the winding central axis so as not to overlap each other.

12. An electrode assembly comprising:
a positive electrode sheet comprising a positive electrode active material portion that is an area on which a positive electrode active material is stacked on a positive electrode collector and a positive electrode non-coating portion that is an area on which the positive electrode active material is not stacked;
a positive electrode tab disposed on the positive electrode non-coating portion;
a negative electrode sheet comprising a negative electrode active material portion that is an area on which a negative electrode active material is stacked on a negative electrode collector and a negative electrode non-coating portion that is an area on which the negative electrode active material is not stacked;
a negative electrode tab disposed on the negative electrode non-coating portion; and
a separator configured to insulate the positive electrode sheet and the negative electrode sheet from each other,
wherein the positive electrode sheet, the separator, and the negative electrode sheet are alternately stacked to be wound,
the positive electrode non-coating portion comprises a first positive electrode non-coating portion and a second positive electrode non-coating portion, which are provided on two portions spaced apart from each other on the positive electrode sheet,
the negative electrode non-coating portion comprises a first negative electrode non-coating portion disposed between opposite side portions of the negative electrode sheet and second and third negative electrode non-coating portions, which are respectively disposed on the opposite side portions of the negative electrode sheet,
the second positive electrode non-coating portion and the first negative electrode non-coating portion are disposed at positions corresponding to each other,
in each of the positive electrode sheet and the negative electrode sheet, a first side portion of the opposite side portions is wound in a clockwise direction to be disposed at a winding outer portion, and a second side portion of the opposite side portions is disposed at a winding central portion, and
the first positive electrode non-coating portion and the second positive electrode non-coating portion are disposed between the opposite side portions on the positive electrode sheet, wherein the second positive electrode non-coating portion is disposed on a side of the second side portion of the positive electrode sheet.

13. An electrode assembly comprising:
a positive electrode sheet comprising a positive electrode active material portion that is an area on which a positive electrode active material is stacked on a positive electrode collector and a positive electrode non-coating portion that is an area on which the positive electrode active material is not stacked;
a positive electrode tab disposed on the positive electrode non-coating portion;
a negative electrode sheet comprising a negative electrode active material portion that is an area on which a negative electrode active material is stacked on a negative electrode collector and a negative electrode non-coating portion that is an area on which the negative electrode active material is not stacked;
a negative electrode tab disposed on the negative electrode non-coating portion; and
a separator configured to insulate the positive electrode sheet and the negative electrode sheet from each other,
wherein the positive electrode sheet, the separator, and the negative electrode sheet are alternately stacked to be wound,
the positive electrode non-coating portion comprises a first positive electrode non-coating portion disposed on the positive electrode sheet, and the negative electrode non-coating portion comprises a first negative electrode non-coating portion disposed on the negative electrode sheet, wherein the first positive electrode non-coating portion and the first negative electrode non-coating portion are disposed at positions corresponding to each other, and
the positive electrode tab comprises a first positive electrode tab disposed on the first positive electrode non-coating portion, and the negative electrode tab comprises a first negative electrode tab disposed on the first negative electrode non-coating portion, wherein the first positive electrode tab and the first negative electrode tab are disposed so as not to overlap each other with respect to a direction in which the positive electrode sheet and the negative electrode sheet face each other.

14. The electrode assembly of claim 13, wherein the first positive electrode tab protrudes toward a first side with respect to a direction parallel to the winding central axis, the first negative electrode tab protrudes toward a second side with respect to the direction parallel to the winding central axis, and ends of the first positive electrode tab and the first negative electrode tab are disposed to be spaced a predetermined distance from each other with respect to the direction parallel to the winding central axis so as not to overlap each other.

15. A secondary battery comprising:

an electrode assembly according to claim 1; and a battery case configured to accommodate the electrode assembly.

16. An electrode assembly comprising:

a positive electrode plate comprising a positive electrode active material portion on which a positive electrode active material is applied on a first surface of a positive electrode collector and a first positive electrode non-coating portion that is an area on which the positive electrode active material is not applied;

a positive electrode tab attached to the first positive electrode non-coating portion;

a negative electrode plate comprising a negative electrode active material portion on which a negative electrode active material is applied on a first surface of a negative electrode collector facing the first surface of the positive electrode collector and a first negative electrode non-coating portion that is an area on which the negative electrode active material is not applied; and a separator disposed between the positive electrode plate and the negative electrode plate, wherein the positive electrode sheet, the separator, and the negative electrode sheet are alternately stacked to be wound, the first positive electrode non-coating portion comprises a first positive electrode non-coating portion and a second positive electrode portion disposed at a first end and a second end of the positive electrode plate in a longitudinal direction of the positive electrode plate, respectively, and the first negative electrode non-coating portion is disposed at a position overlapping the first positive electrode non-coating portion, the first negative electrode non-coating portion is disposed between a second negative electrode non-coating portion and a third negative electrode non-coating portion, which are respectively disposed on opposite side portions of the negative electrode plate, and to which a negative electrode tab is attached, and the electrode assembly further comprises a negative electrode tab disposed on the first negative electrode non-coating portion.

17. The electrode assembly of claim 16, wherein the electrode assembly is an electrode assembly for a lithium ion secondary battery, a first negative electrode insulation tape is further attached to the first negative electrode non-coating portion to cover the negative electrode tab attached to the first negative electrode non-coating portion, and a lithium ion deposition prevention tape is further attached to a portion of the positive electrode plate facing the first negative electrode insulation tape to prevent lithium ions from being accumulated to be deposited when charging and discharging.

18. The electrode assembly of claim 17, wherein the first negative electrode non-coating portion and the lithium ion deposition prevention tape face each other with the separator therebetween, and the lithium ion deposition prevention tape is disposed on a surface of the positive electrode active material portion of the positive electrode plate.

19. The electrode assembly of claim 16, wherein the positive electrode tab attached to the first positive electrode non-coating portion and the negative electrode tab attached to the first negative electrode non-coating portion are disposed so as not to overlap each other with respect to a direction in which the positive electrode plate and the negative electrode plate face each other.

* * * * *